(12) United States Patent
Yi et al.

(10) Patent No.: US 11,972,168 B2
(45) Date of Patent: Apr. 30, 2024

(54) DISPLAY DEVICE AND CONTROLLING METHOD THEREOF

(71) Applicant: Samsung Electronics Co., Ltd., Suwon-si (KR)

(72) Inventors: Sanghun Yi, Suwon-si (KR); Sangwon Kim, Suwon-si (KR); Youngkook Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 203 days.

(21) Appl. No.: 17/841,603

(22) Filed: Jun. 15, 2022

(65) Prior Publication Data
US 2023/0133968 A1    May 4, 2023

Related U.S. Application Data

(63) Continuation of application No. PCT/KR2022/005339, filed on Apr. 13, 2022.

(30) Foreign Application Priority Data

Nov. 2, 2021 (KR) .......................... 10-2021-0149071

(51) Int. Cl.
*G09G 5/00* (2006.01)
*G06F 3/14* (2006.01)

(52) U.S. Cl.
CPC .................................. *G06F 3/1446* (2013.01)

(58) Field of Classification Search
None
See application file for complete search history.

(56) References Cited

U.S. PATENT DOCUMENTS

| 7,236,143 B2 | 6/2007 | Fan et al. |
| 7,843,401 B2 * | 11/2010 | Morikawa ............. G06F 3/1446 |
| | | 345/1.1 |

(Continued)

FOREIGN PATENT DOCUMENTS

| CN | 103945254 A | 7/2014 |
| JP | 2000-020042 | 1/2000 |

(Continued)

OTHER PUBLICATIONS

International Search Report (PCT/ISA/210) issued Jul. 19, 2022 by the International Searching Authority in International Application No. PCT/KR2022/005339.

(Continued)

*Primary Examiner* — Carl Adams
(74) *Attorney, Agent, or Firm* — Sughrue Mion, PLLC

(57) ABSTRACT

A display module configured to form a portion of a modular display device including a plurality of display modules includes first to third I2C communication interfaces and a processor. The processor is configured to: receive, via the first I2C communication interface from a first display module adjacent in a first direction, an x coordinate value of the first display module; receive, via the second I2C communication interface from a second display module adjacent in a second direction, a y coordinate value of the second display module; identify x and y coordinate values of the display module based on the received x and y coordinate values; transmit, via the third I2C communication interface, the identified x coordinate value to a third display module adjacent in a third direction; and transmit, via the third I2C communication interface, the identified y coordinate value to a fourth display module adjacent in a fourth direction.

20 Claims, 20 Drawing Sheets

(56) References Cited

U.S. PATENT DOCUMENTS

| | | |
|---|---|---|
| 9,134,950 B2 | 9/2015 | Choi et al. |
| 9,354,840 B2 | 5/2016 | Seo et al. |
| 9,612,789 B2 | 4/2017 | Kim et al. |
| 11,055,052 B2 | 7/2021 | Seo et al. |
| 2005/0062884 A1 | 3/2005 | Fan et al. |
| 2011/0122048 A1 | 5/2011 | Choi et al. |
| 2020/0326899 A1 | 10/2020 | Seo et al. |
| 2024/0020851 A1* | 1/2024 | Beziaeva ............... G06T 13/40 |

FOREIGN PATENT DOCUMENTS

| | | |
|---|---|---|
| JP | 2005-115367 A | 4/2005 |
| JP | 2007-166364 A | 6/2007 |
| JP | 2011-257540 A | 12/2011 |
| JP | 2012-185297 A | 9/2012 |
| JP | 2016-045445 | 4/2016 |
| KR | 10-0642505 | 11/2006 |
| KR | 10-2011-0080784 A | 7/2011 |
| KR | 10-2012-0064212 A | 6/2012 |
| KR | 10-2015-0089146 | 8/2015 |
| KR | 10-1632572 B1 | 7/2016 |
| KR | 10-2017-0045979 | 4/2017 |
| KR | 10-1786319 | 10/2017 |
| KR | 10-1845386 | 4/2018 |
| KR | 10-1890656 | 8/2018 |
| KR | 10-1957241 | 3/2019 |
| KR | 10-2116727 | 5/2020 |
| KR | 10-2020-0121182 A | 10/2020 |

OTHER PUBLICATIONS

Written Opinion (PCT/ISA/237) issued Jul. 19, 2022 by the International Searching Authority in International Application No. PCT/KR2022/005339.

* cited by examiner

FIG. 12

| PANEL TYPE | PITCH | X PIXEL | Y PIXEL | FINAL CABINET X COORDINATE | FINAL CABINET Y COORDINATE | RESOLUTION |
|---|---|---|---|---|---|---|
| IW008J | P0.84 | 960 | 540 | M | N | (960*M) × (540*N) |
| IW012J | P1.26 | 640 | 360 | M | N | (640*M) × (360*N) |
| IW016J | P1.68 | 480 | 270 | M | N | (480*M) × (270*N) |
| IF015H | P1.5 | 320 | 360 | M | N | (320*M) × (360*N) |
| IF020H | P2.0 | 240 | 270 | M | N | (240*M) × (270*N) |
| IF025H | P2.5 | 192 | 216 | M | N | (192*M) × (216*N) |
| ... | ... | ... | ... | ... | ... | ... |

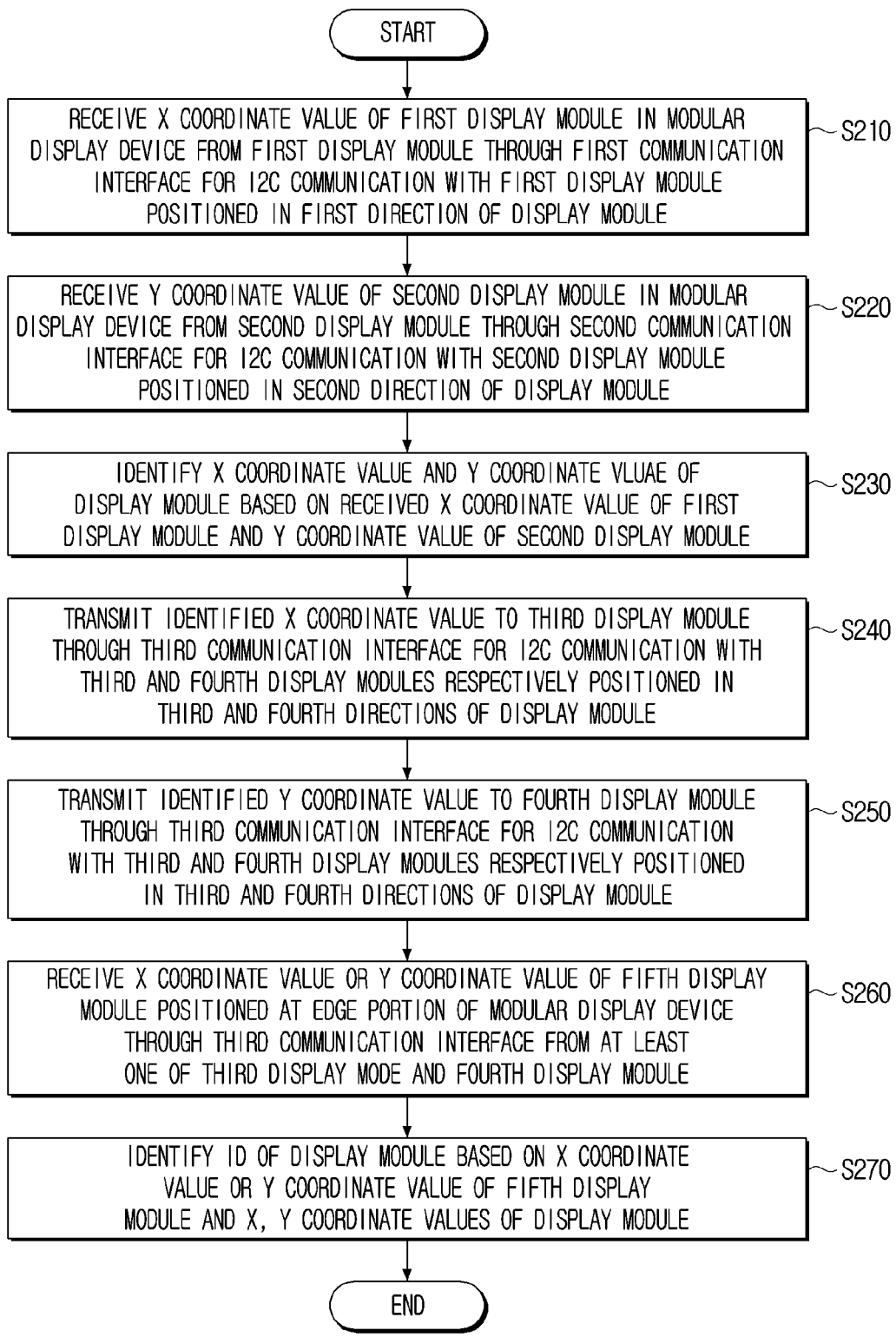

DISPLAY DEVICE AND CONTROLLING METHOD THEREOF

CROSS-REFERENCE TO RELATED APPLICATION(S)

This application is a bypass continuation of International Application No. PCT/KR2022/005339, filed on Apr. 13, 2022, which is based on and claims priority to Korean Patent Application No. 10-2021-0149071, filed on Nov. 2, 2021, in the Korean Intellectual Property Office, the disclosures of which are incorporated by reference herein in their entireties.

BACKGROUND

1. Field

Embodiments generally relate to a display device and a method of controlling the display device, and more particularly, to a display module, which forms a portion of a modular display, automatically identifying (or determining) coordinate values of the display module upon receiving coordinate values of another, adjacent display module, and a method of controlling the display module.

2. Description of the Related Art

The development of display technology has diversified the size and modularity of display screens. In the past, it was only possible to produce display devices having a limited size, but now it is possible to produce display devices with larger screens and to combine display devices to realize even larger display screens. As such, the use of large screen display devices has increased, and in particular, the use of modular display devices providing an extended display screen by combining a plurality of display modules has increased. For example, a display device having a large screen may be utilized as a digital signage billboard installed in a location with large floating populations, such as subway stations, malls, bus stops, etc. Such display devices may be utilized to display outdoor advertisements or other information.

The above information disclosed in this section is only for understanding the background of the inventive concepts, and, therefore, may contain information that does not form prior art.

SUMMARY

It is recognized that a display screen of a modular display device may be flexibly expanded or reduced in size according to the number of display modules and a combination (or arrangement) relationship thereof. As such, it is convenient to provide large, adaptable display devices to users, but an intensive process of setting identification values and coordinate values corresponding to a position in which each display module is disposed within an arrangement typically accompanies such modular display systems. Setting the identification value and the coordinate values for each display module conventionally requires separate equipment and relatively long processing times. For instance, when a specific display module among a plurality of conventional display modules is replaced, the identification value and the coordinate values must be reset such that unnecessary processing time and costs are repeatedly expended as such display modules are replaced and/or rearranged. Accordingly, a need exists for efficient, cost-effective techniques to address these, as well as other issues.

One or more embodiments are capable of providing a device allowing a display module to receive coordinate values of a nearby display module and to identify (or determine) a coordinate value corresponding to a position of the display module based on the received coordinate values.

One or more embodiments are capable of providing a method of controlling a device allowing a display module to receive coordinate values of a nearby display module and to identify (or determine) a coordinate value corresponding to a position of the display module based on the received coordinate values.

Additional features will be set forth in the detailed description which follows, and in part, will be apparent from the disclosure, or may be learned by practice of the inventive concepts.

According to an embodiment, a display module configured to form a portion of a modular display device including a plurality of display modules includes a first communication interface, a second communication interface, a third communication, and a processor. The first communication interface is configured to communicate, via inter-integrated circuit (I2C) communication, with a first display module among the plurality of display modules, the first display module being disposed in a first direction with respect to the display module. The second communication interface is configured to communicate, via I2C communication, with a second display module among the plurality of display modules, the second display module being disposed in a second direction with respect to the display module. The third communication interface is configured to communicate, via I2C communication, with third and fourth display modules among the plurality of display modules, the third and fourth display modules being respectively disposed in third and fourth directions with respect to the display module. The processor is configured to: receive, via the first communication interface from the first display module, an x coordinate value of the first display module; receive, via the second communication interface from the second display module, a y coordinate value of the second display module; identify an x coordinate value and a y coordinate value of the display module based on the received x coordinate value and the received y coordinate value; transmit the identified x coordinate value to the third display module via the third communication interface; and transmit the identified y coordinate value to the fourth display module via the third communication interface.

In an embodiment, the display module may be adjacent to each of the first, second, third, and fourth display modules. The first direction may be a direction opposite the third direction on an x axis of an x-y plane on which the plurality of display modules may be disposed. The second direction may be a direction opposite the fourth direction on a y axis of the x-y plane.

In an embodiment, the processor may be configured to: add the received x coordinate value to a basic x coordinate value of the display module to identify the x coordinate value of the display module; and add the received y coordinate value to a basic y coordinate value of the display module to identify the y coordinate value of the display module. In an embodiment, the first direction may be a leftward direction with respect to the display module, the second direction may be a downward direction with respect to the display module, the third direction may be a rightward direction with respect to the display module, and the fourth direction may be an upward direction with respect to the display module.

In an embodiment, basic x coordinate values and basic y coordinate values of the plurality of display modules may be equivalent.

In an embodiment, the basic x coordinate values of the plurality of display modules may be 1, and the basic y coordinate values of the plurality of display modules may be 1.

In an embodiment, the processor may be configured to identify, in response to an x coordinate value of a fifth display module disposed at an edge portion of the modular display device being received from at least one of the third display module and the fourth display module via the third communication interface, an identification of the display module based on the received x coordinate value of the fifth display module and an x, y coordinate value of the display module.

In an embodiment, the processor may be configured to identify the identification of the display module as ID=(y−1)*X+x.

Where ID is the identification of the display module, X is the x coordinate value of the fifth display module, x is the identified x coordinate value of the display module, and y is the identified y coordinate value of the display module.

In an embodiment, the fifth display module may be a display module disposed on a rightmost side of the modular display device from among the plurality of display modules, the first direction may be a leftward direction with respect to the display module, the second direction may be a downward direction with respect to the display module, the third direction may be a rightward direction with respect to the display module, and the fourth direction may be an upward direction with respect to the display module.

According to an embodiment, a method of controlling a display module in a modular display device includes: receiving, from a first display module of the modular display device via a first communication interface configured to communicate via inter-integrated circuit (I2C) communication, an x coordinate value of the first display module, the first display module being disposed in a first direction with respect to the display module; receiving, from a second display module of the modular display device via a second communication interface configured to communicate via I2C communication, a y coordinate value of the second display module, the second display module being disposed in a second direction with respect to the display module; determining an x coordinate value and a y coordinate value of the display module based on the received x coordinate value and the received y coordinate value; transmitting, via a third communication interface configured to communicate via I2C communication, the determined x coordinate value to a third display module of the modular display device, the third display module being disposed in a third direction with respect to the display module; and transmitting, via the third communication interface, the identified y coordinate value to the fourth display module through the third communication interface, the fourth display module being disposed in a fourth direction with respect to the display module.

In an embodiment, the display module may be adjacent to each of the first, second, third, and fourth display modules. The first direction may be a direction opposite the third direction on an x axis of an x-y plane on which the plurality of display modules may be disposed. The second direction may be a direction opposite the fourth direction on a y-axis of the x-y plane.

In an embodiment, determining the x coordinate value and the y coordinate value of the display module includes: adding the received x coordinate value to a basic x coordinate value of the display module to determine the x coordinate value of the display module; and adding the received y coordinate value to a basic y coordinate value of the display module to identify the y coordinate value of the display module.

In an embodiment, the first direction may be a leftward direction with respect to the display module; the second direction may be a downward direction with respect to the display module; the third direction may be a rightward direction with respect to the display module; and the fourth direction may be an upward direction with respect to the display module.

In an embodiment, basic x coordinate values and basic y coordinate values of the plurality of display modules may be equivalent.

In an embodiment, the basic x coordinate values of the plurality of display modules may be 1, and the basic y coordinate values of the plurality of display modules may be 1.

In an embodiment, the method may further include: receiving an x coordinate value of a fifth display module disposed at an edge portion of the modular display device from at least one of the third display module and the fourth display module via the third communication interface; and determining an identification of the display module based on the x coordinate value of the fifth display module and an x, y coordinate value of the display module.

In an embodiment, identification of the display module may be identified as ID=(y−1)*X+x.

Where ID is the identification of the display module, X is the x coordinate value of the fifth display module, x is the identified x coordinate value of the display module, and y is the identified y coordinate value of the display module.

In an embodiment, the fifth display module may be a display module disposed on a rightmost side of the modular display device from among the plurality of display modules, the first direction may be a leftward direction with respect to the display module, the second direction may be a downward direction with respect to the display module, the third direction may be a rightward direction with respect to the display module, and the fourth direction may be an upward direction with respect to the display module.

Advantageous Effects

According to various embodiments, it is possible to set coordinates corresponding to arrangement positions of each of a plurality of display modules configuring a modular display device without separate processing equipment.

According to various embodiments, since each display module transmits and receives coordinate values of each display module based on an I2C method, coordinates may be automatically set even if a specific display module among a plurality of display modules is replaced.

According to various embodiments, when setting of the coordinates of all the display modules configuring the modular display device is complete, an identification value (ID) corresponding to each display module may be automatically set such that costs for providing separate equipment for ID setting and time required for ID setting may be reduced.

BRIEF DESCRIPTION OF THE DRAWINGS

The accompanying drawings, which are included to provide a further understanding of the inventive concepts, and are incorporated in and constitute a part of this specification, illustrate embodiments of the inventive concepts, and, together with the description, serve to explain principles of the inventive concepts.

FIG. 12 is a diagram illustrating a table used for image resolution adjustment according to an embodiment.

FIG. 16 is a flowchart schematically illustrating a method of identifying an identification corresponding to a display module based on an x-coordinate value of a fifth display module and a coordinate value of a display module according to an embodiment.

DETAILED DESCRIPTION

Figure 1:
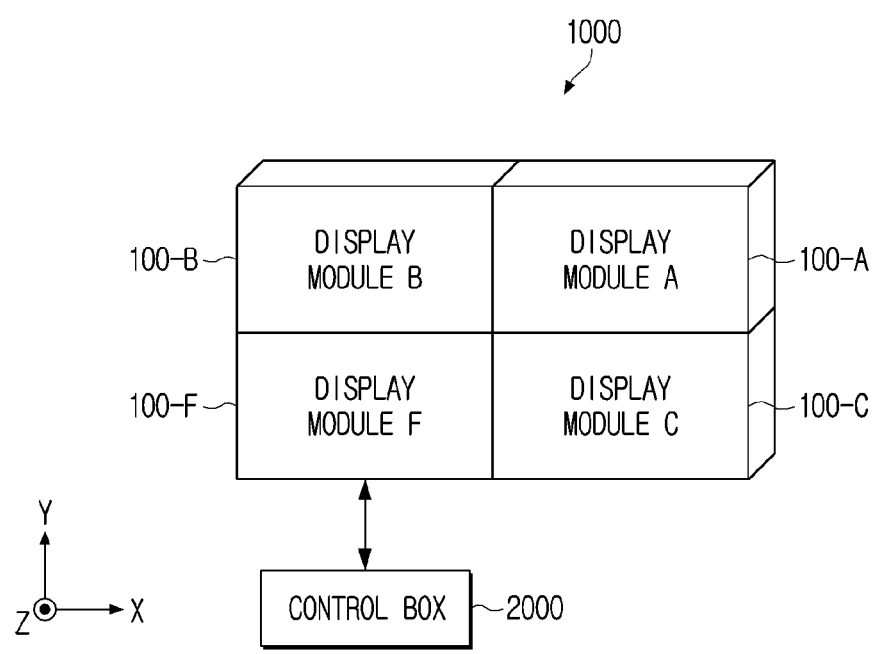
FIG. 1 is a diagram schematically illustrating an operation of setting coordinates of a plurality of display modules configuring a modular display device according to an embodiment.

In the following description, for the purposes of explanation, numerous specific details are set forth in order to provide a thorough understanding of various embodiments. As used herein, the terms "embodiments" and "implementations" may be used interchangeably and are non-limiting examples employing one or more of the inventive concepts disclosed herein. It is apparent, however, that various embodiments may be practiced without these specific details or with one or more equivalent arrangements. In other instances, well-known structures and devices are shown in block diagram form to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing example features of varying detail of some embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts. To this end, the expressions "have," "may have," "include," "may include," and the like, refer to the existence of a corresponding feature (e.g., numeral, function, operation, or constituent element, such as component), and does not exclude one or more additional features.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, operative, communicative, and/or fluid connection. In addition, the X-axis, the Y-axis, and the Z-axis are not limited to three axes of a rectangular coordinate system, and may be interpreted in a broader sense. For example, the X-axis, the Y-axis, and the Z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing some embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art. Further, a "user" may indicate a person who receives (or perceives) content by way of a display device, but is not limited thereto.

Various embodiments are described herein with reference to block diagrams, sectional views, isometric views, perspective views, plan views, and/or exploded illustrations that are schematic illustrations of idealized embodiments and/or intermediate structures. As such, variations from the shapes of the illustrations as a result of, for example, manufacturing techniques and/or tolerances, are to be expected. Thus, embodiments disclosed herein should not be construed as limited to the particular illustrated shapes of regions, but are to include deviations in shapes that result from, for instance, manufacturing. To this end, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the inventive concepts. Further, the blocks, units, and/or modules of some embodiments may be physically combined into more complex blocks, units, and/or modules without departing from the inventive concepts.

Hereinafter, various embodiments will be explained in detail with reference to the accompanying drawings.

FIG. 1 is a diagram schematically illustrating an operation of setting coordinates of a plurality of display modules configuring a modular display device according to an embodiment.

Referring to FIG. 1, a modular display device 1000 includes a plurality of display modules, e.g., display modules 100-A, 100-B, 100-C, and 100-F. Hereinafter, one or more display modules, such as display modules 100-A, 100-B, 100-C, and 100-F, may be collectively and/or individually referred to as display module(s) 100.

According to an embodiment, the modular display device 1000 may be implemented as a single large display device, such as a digital signage, an electronic display, and/or the like, in which a plurality of display modules 100 are combined or assembled, or one small display device, such as a monitor for a personal computer or a television, but is not limited thereto.

The plurality of display modules 100 may be arranged in a matrix format to configure a larger, modular display device 1000. Although four display modules, e.g., display modules 100-A, 100-B, 100-C, and 100-F, are illustrated in FIG. 1 as configuring the modular display device 1000, any suitable number of display modules 100 may be combined to implement the modular display device 1000, which may have a different size and/or different resolution. In addition, to implement the modular display device 1000, the plurality of display modules 100 may be arranged in various matrix forms other than a 2×2 matrix form shown in FIG. 1. For instance, according to an embodiment, the plurality of display modules 100 may be arranged in a matrix of M×N (where M and N are natural numbers greater than or equal to 1). It is also contemplated that any other suitable arrangement may be utilized.

According to an embodiment, the modular display device 1000 receives image information on an image to output through a display panel from a control box 2000. The control box 2000 transmits image information to the modular display device 1000 and controls luminance and volume of each of the display modules 100-A, 100B, 100-C, and 100-F. In FIG. 1, the control box 2000 is illustrated as a device separate from the modular display device 1000, but embodiments are not limited thereto. The control box 2000 may be implemented as a central processing unit (CPU), a micro controller unit (MCU), and/or the like of the modular display device 1000.

The modular display device 1000 may output a specific image through the plurality of display modules 100 configuring the modular display device 1000. For example, when each display module 100 is combined according to a predetermined arrangement, the modular display device 1000 displays a specific image through the entire group of display panels implemented as display panels of each display module 100. In this case, a portion of specific image information is output on the display panel of each display module 100 to generate the specific image.

For example, referring to FIG. 1, the lower left display module 100_F may display a lower left region of a specific image, the lower right display module 100_C may display a lower right region of the specific image, the upper left display module 100_B may display an upper left region of the image, and the upper right display module 100_A may display an upper right region of the image. For instance, each of the display modules 100-A, 100-B, 100-C, and 100-F may output an image of one region of the entire image corresponding to the position of each display module 100 in the modular display device 1000.

In this case, a method for each display module 100 to display a portion of an image corresponding to a position in which each display module 100 is disposed is as follows. Each display module 100 receives specific image information from the control box 2000 and identifies a position in which each display module 100 is disposed. In addition, each display module 100 identifies pixel information of a region of the image corresponding to the identified position, for example, a region within the image corresponding to the arrangement position. Then, each display module 100 displays a portion of the image based on the identified pixel information. In this manner, for each display module 100 to output a specific portion of the image corresponding to the position in which each display module 100 is disposed, each display module 100 should identify a position thereof in the modular display device 1000.

When a plurality of display modules 100 are arranged in a matrix form, each display module 100 may identify a position in which each display module 100 is positioned and a coordinate value corresponding to the position. For example, referring back to FIG. 1, when an X-axis and a Y-axis are set based on the lower left display module 100-F among the plurality of display modules, a rightward direction of the corresponding display module 100-F may correspond a (+) direction of the X coordinate, and an upward direction of the corresponding display module 100-F may correspond to a (+) direction of the Y coordinate. Also, when a coordinate value of the lower left display module 100-F is set to (1, 1), a coordinate value of the lower right display module 100-C may be set to (2, 1), a coordinate value of the upper left display module 100-B may be set to (1, 2), and a coordinate value of the upper right display module 100-A may be set to (2, 2). As such, setting the positions of the respective display modules 100 to correspond to the coordinate values facilitates control each display module 100 because the position of each of the plurality of display modules 100 may be intuitively identified.

Accordingly, when the modular display device 1000 is implemented using a plurality of display modules 100, a process of setting coordinate values corresponding to the arrangement positions of the respective display modules 100 is utilized. However, in a conventional modular display device, to set coordinates for each display module, a separate device is required.

For example, to implement a conventional modular display device through a light-emitting diode (LED) display module, it was necessary to set the position coordinates and identification values for each LED display module using a light emitting diode (LED) signage manager (LSM) program with a separate personal computer (PC) based on, for instance, a windows operating system (OS). Also, it was necessary to connect a socket for management data clock (MDC) Ethernet protocol communication between each display module. In particular, when the number of display modules is large, it takes a lot of time to connect the socket.

To solve this issue, according to various embodiments, in a state in which a plurality of display modules 100 are disposed, each display module 100 transmits and receives coordinate information, and automatically sets coordinates corresponding to a position in which each display module 100 is disposed without a separate device.

For instance, referring to FIG. 1, a processor of the lower left display module 100-F identifies the coordinate value information corresponding to the position of the lower left display module 100-F, and then transfers the identified coordinate value information to each of the adjacent upper left display module 100-B and the upper right display module 100-A. In some embodiments, the lower left display module 100-F provides the identified coordinate value information to the lower right display module 100-C. Also, a processor of the upper left display module 100-B identifies a coordinate value corresponding to the position of the upper left display module 100-B based on the received coordinate value information of the lower left display module 100-F. Similarly, a processor of the lower right display module 100-C identifies a coordinate value related to the lower right display module 100-C based on received coordinate value information of the lower left display module 100-F, which may be received from the lower left display module 100-F or one or more of the other display modules 100. In this manner, the processor of each display module 100 may receive the coordinate value information of adjacent display modules 100 for which the coordinate value identification is complete, and may set the coordinate value of the corresponding display module 100 based on the received coordinate value information. Therefore, according to various embodiments, there is no need for a separate device for setting the coordinates and setting the identification value corresponding to the coordinates, and in particular, the cost and time required for setting the coordinates of each of the display modules 100 configuring the modular display device 1000 may be saved or at least reduced.

Hereinafter, an embodiment of the disclosure in which each of a plurality of display modules 100 configuring the modular display device 1000 identifies coordinate information corresponding to its position in the modular display device 1000 is described in more detail with reference to FIGS. 2 and 3.

Figure 2:
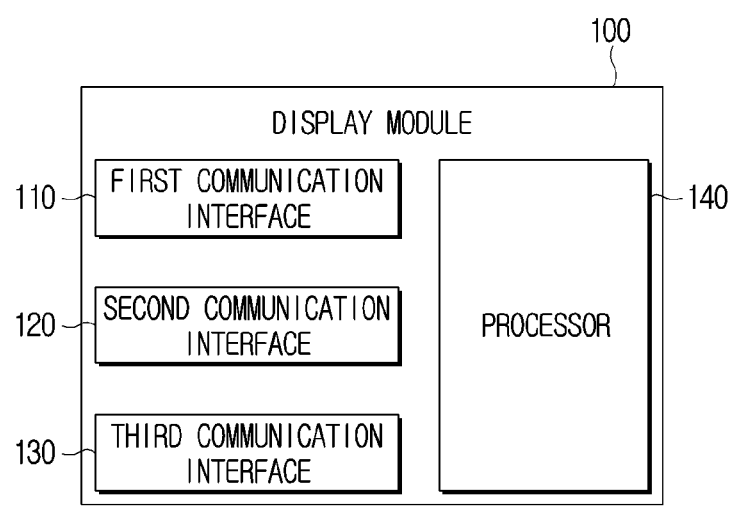
FIG. 2 is a block diagram illustrating a configuration of a display module according to an embodiment.
Figure 3:
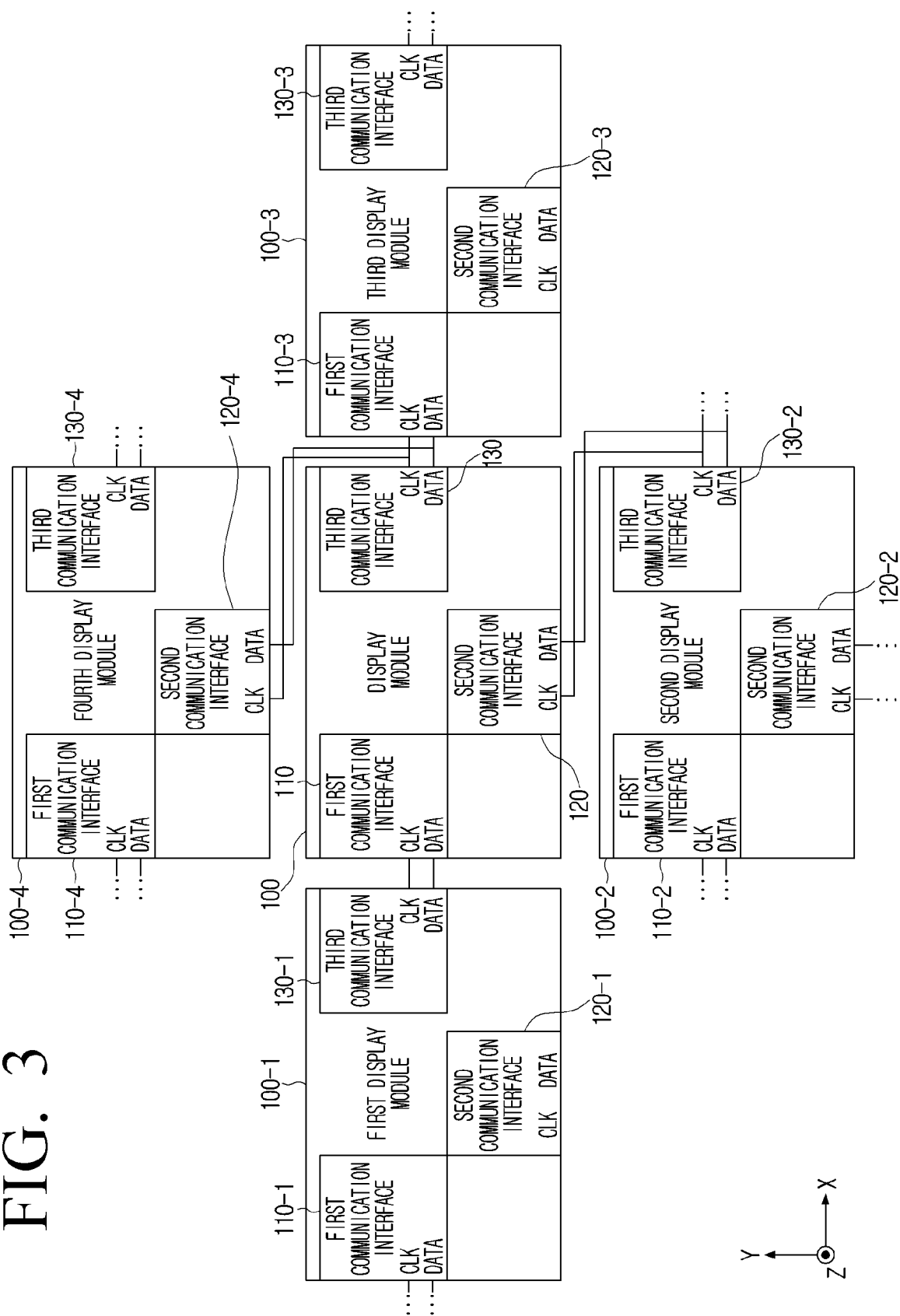
FIG. 3 is a diagram illustrating I2C communication connections between a display module and first to fourth display modules according to an embodiment.

FIG. 2 is a block diagram illustrating a configuration of a display module according to an embodiment. FIG. 3 is a diagram illustrating I2C communication connections between a display module and first to fourth display modules according to an embodiment.

As seen in FIG. 2, the display module 100 includes a first communication interface 110, a second communication interface 120, a third communication interface 130, and a processor 140.

In this case, the first communication interface 110, the second communication interface 120, and the third communication interface 130 are used for I2C communication with the display module 100 and/or other display modules 100 in implementing the modular display device 1000.

It is noted that I2C communication refers to a communication method in which one or more master devices and one or more slave devices transmit and receive information in both directions through two communication lines (e.g., a serial data (SDA) line and a serial clock (SCL) line).

In I2C communication, the master device transmits a clock signal to the slave device through the SCL line, and transmits data to the slave device through the SDA line. For example, the master device transmits a low-value clock signal to the slave device through the SCL line, and then transmits data including address information of the slave device to the slave device through the SDA line. Then, the slave device identifies whether the address information in the received data matches an address of the slave device, and when it is identified as matching, the slave device transmits an Ack Signal, which is a response signal, to the master device. When the master device receives the Ack Signal from the slave device, the master device recognizes that the data has been transmitted effectively.

The roles of the master device and the slave device may be interchanged between a plurality of devices using the I2C communication method. For example, the roles of the master device and the slave device may be interchanged according to the type of information transmitted and received between the master device and the slave device. For first information, when a first device, as a master device, transmits the first information to a second device, as a slave device, the second device, as a master device, may transmit second information to the first device, as a slave device. In this regard, according to an embodiment, the display module 100 may operate as a slave device when receiving data for setting coordinates (e.g., coordinate values of other adjacent display modules 100), and after coordinates setting is completed, the display module 100 may operate as a master device when transmitting coordinate information of the display module 100 for setting coordinates of another adjacent display module 100. This will be described below in more detail.

The first communication interface 110 of the display module 100 is an interface used for I2C communication with the first display module 100-1 located in a first direction (e.g., −X direction) with respect to the display module 100.

In addition, the second communication interface 120 of the display module 100 is an interface used for I2C communication with the second display module 100-2 located in a second direction (e.g., −Y direction) with respect to the display module 100.

In addition, the third communication interface 130 of the display module 100 is an interface used for I2C communication with the third and fourth display modules 100-3 and 100-4 respectively located in third and fourth directions (e.g., +X and +Y directions) with respect to the display module 100. The third communication interface 130 is different from the first communication interface 110 and the second communication interface 120 each connected to a single display module, in that it is connected to the third and fourth display modules 100-3 and 100-4, which are a plurality of display modules.

According to an embodiment, the display module 100 includes the processor 140. The processor 140 controls an overall operation of the display module 100. For instance, the processor 140 may be connected to each component of the display module 100 to generally control the operation of the display module 100. For example, the processor 140 may be connected to a driving unit, a memory, and a communication unit to control the operation of the display module 100.

According to an embodiment, the processor 140 may be a digital signal processor (DSP), a microprocessor, a central processing unit (CPU), a micro controller unit (MCU), a micro processing unit (MPU), a neural processing unit (NPU), a controller, an application processor (AP), a timing controller (TCON), etc., but embodiments are not limited thereto. For the purposes of this disclosure, the processor 140 is described as an example.

The processor 140 may also be implemented in a system on chip (SoC), large scale integration (LSI), or a field programmable gate array (FPGA) form. In addition, the processor 140 may include a volatile memory, such as static random-access memory (SRAM), but any other suitable volatile and/or non-volatile memory may be utilized.

To set coordinates, the processor 140 of the display module 100, as a slave device, may receive coordinate information from a master device through the first communication interface 110 and the second communication interface 120. When the processor 140 identifies a coordinate value of the display module 100 based on the received coordinate information, the processor 140, as a master device, may transmit the coordinate value of the display module 100 to a slave device through the third communication interface 130.

Accordingly, before setting the coordinate value of the display module 100, the processor 140 operates as a slave device to receive the coordinate information of another (e.g., adjacent) display module, and, after setting the coordinate values of the display module 100, the processor 140 operates as a master device to transmit the coordinate information of the display module 100. In this case, in setting the coordinates, when the display module 100 operates as a slave device, the processor 140 uses the first communication interface 110 and the second communication interface 120, whereas when the display module 100 operates as a master device, the processor 140 uses the third communication interface 130.

In this regard, a connection relationship of the display module 100 through the first to third communication interfaces 110 to 130 with other adjacent display modules according to an embodiment is described with reference to FIG. 3. Referring to FIG. 3, the display module 100 is connected to the first display module 100-1, which is a first master device, by a first I2C line (e.g., a first SDA line and a first SCL line) through the first communication interface 110, and connected to the second display module 100-2, which is a second master device, by a second I2C line (e.g., a second SDA line and a second SCL line) through the second communication interface 120. Also, the display module 100 may be connected to the third display module 100-3 and the fourth display module 100-4, which are slave devices, by a third I2C line (e.g., a third SDA line and a third SCL line) through the third communication interface 130.

For the purposes of this disclosure, the first display module 100-1 refers to a display module disposed in the first direction of the display module 100 to configure the modular display device 1000. Also, for the purposes of this disclosure, the second display module 100-2 refers to a display module disposed in the second direction of the display module 100 to configure the modular display device 1000. In a like manner, the third display module 100-3 refers to a display module disposed in the third direction of the display module 100 to configure the modular display device 1000, and the fourth display module 100-4 refers to a display module disposed in the fourth direction of the display module 100 to configure the modular display device 1000.

Since the first to fourth display modules 100-1 to 100-4 refer to the display modules arranged to correspond to respective directions (e.g., first to fourth directions) based on the display module 100, the first to fourth display modules 100-1 to 100-4 are relatively determined according to the position of the display module 100. This will be described below in more detail with reference to FIGS. 4 and 5.

According to an embodiment, the processor 140 receives an x-coordinate value of the first display module 100-1 in the modular display device 1000 from the first display module 100-1 through the first communication interface 110. In addition, the processor 140 receives a y-coordinate value of the second display module 100-2 in the modular display device 1000 from the second display module 100-2 through the second communication interface 120. In addition, the processor 140 may identify an x-coordinate value and a y-coordinate value of the display module 100 based on the received x-coordinate value and the y-coordinate value.

Figure 4:
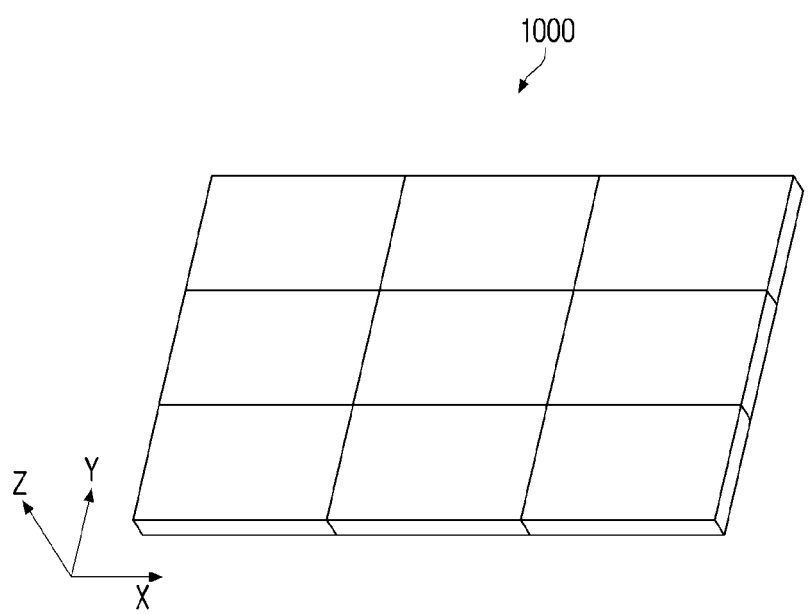
FIG. 4 is a diagram illustrating coordinate axes of a plurality of display modules configuring a modular display device according to an embodiment.

FIG. 4 is a diagram illustrating coordinate axes of a plurality of display modules configuring a modular display device according to an embodiment.

Referring to FIG. 4, a plurality of display modules 100 configuring the modular display device 1000 according to an embodiment may be disposed adjacent to each other on a specific plane. In this case, the processor 140 identifies the plane on which the display module 100 is disposed as an x-y plane and identifies a coordinate value corresponding to a position in which the display module 100 is disposed in the modular display device 1000. Alternatively, the processor 140 identifies the plane on which the display module 100 is disposed as the x-y plane and identifies a coordinate value corresponding to the position of the display module 100 in a matrix corresponding to a form in which the plurality of display modules is arranged. In this case, the processor 140 identifies an x-coordinate value and a y-coordinate value of the display module 100 in the modular display device 1000. However, embodiments are not limited thereto, and when the processor 140 identifies the plane on which the display module 100 is disposed as an x-z plane, a coordinate value corresponding to the position in which the display module 100 is disposed may be identified as an x coordinate value and a z-coordinate value. Similar logic applies to other planes in a three-dimensional (3D), Cartesian coordinate system.

Hereinafter, a method in which the processor 140 identifies a coordinate value of the display module 100 through exchange of coordinate value information between the display module 100 and other adjacent display modules is described in more detail.

According to an embodiment, the processor 140 receives an x-coordinate value of the first display module 100-1 from the first display module 100-1 located in the first direction through the first communication interface 110 to identify an x-coordinate value corresponding to a position in which the display module 100 is disposed on a two-dimensional (2D) plane. In this case, data including the x-coordinate value received from the first display module 100-1 includes address information on a specific slave device to which the corresponding data is to be transmitted. The processor 140 extracts the address information on the specific slave device included in data received through the first communication interface 110 and compares the address information on the specific slave device with an address of the display module 100 to identify whether both address information matches each other. In addition, if it is identified that the address information on the specific slave device included in the data matches the address of the display module 100, the processor 140 transmits an acknowledgement signal (Ack signal), which is a response signal, to the first display module 100-1 through the first communication interface 110. Upon receiving the Ack signal, the first display module 100-1 identifies that the information on the x-coordinate is effectively transmitted to the display module 100. If it is identified that the address information on the specific slave device included in the data does not match the address of the display module 100, the processor 140 may transmit a non-acknowledgement signal (Nack signal) to the first display module 100-1 through the first communication interface 110.

To identify the y-coordinate value corresponding to the position in which the display module 100 is disposed on the 2D plane, the processor 140 receives a y-coordinate value of the second display module 100-2 from the second display module 100-2 located in the second direction through the second communication interface 120.

The address information of the display module 100 may be set in advance to correspond to each communication interface for I2C communication. In this case, at least one address information may be set in advance in each communication interface. When a wireless or wired connection for I2C communication between a slave device and a master device is established, the slave device is given an address set in response to the corresponding interface from the master device.

Referring back to FIG. 3, the display module 100, as a slave device, is connected to the first display module 100-1 through the first communication interface 110 and the second display module 100-2 through the second communication interface 120. In this case, when the display module 100 for I2C communication and the first display module 100-1 are connected, the processor 140 is assigned an address of the display module 100 for the first display module 100-1 from the first display module 100-1 through the first communication interface 110. For instance, the processor 140 is assigned address information set in the third communication interface 130-1 used for the first display module 100-1 to operate as a master device through the first communication interface 110. In addition, when the display module 100 for I2C communication and the second display module 100-2 are connected, the processor 140 is assigned an address of the display module 100 for the second display module 100-2 from the second display module 100-2 through the second communication interface 120. For example, the processor 140 receives address information set in the communication interface 130-2 used by the second display module 100-2 to operate as a master device.

In this case, according to an embodiment, the display module 100 may include a plurality of address information received from a plurality of master devices. In this case, the display module 100 is assigned different address information from each master device.

When the display module 100 operates as a master device, the processor 140 may assign an address to the third display module 100-3 and the fourth display module 100-4, which are slave devices with respect to the display module 100. Referring back to FIG. 3, when the display module 100 and the third display module 100-3 are connected through the third communication interface 130, the processor 140 assigns an address to the third display module 100-3. Also, when the display module 100 and the fourth display module 100-4 are connected through the third communication interface 130, the processor 140 may assign an address to the fourth display module 100-4. In this case, the processor 140 assigns different addresses to the third display module 100-3 and the fourth display module 100-4 connected through the same third communication interface 130. As such, there may be a plurality of address information set to correspond to one communication interface. The address information that the display module 100 assigns or is assigned is used in the process of transmitting and receiving data for setting coordinates of the display module 100.

According to an embodiment, after the coordinate value of the display module 100 is identified based on the x-coordinate value of the first display module 100-1 and the y-coordinate value of the second display module 100-2, the processor 140 may transmit the identified x-coordinate value of the display module 100 to the third display module 100-3 through the third communication interface 130 and the identified y-coordinate value of the display module 100 to the fourth display module 100-4 through the third communication interface 130. For instance, when the identifying of the x-coordinate value and the y-coordinate value of the display module 100 is completed, the processor 140 separates the coordinate values of the display module 100 into an x-coordinate value and a y-coordinate value and transmits the separated x-coordinate value and y-coordinate value to the different display modules (e.g., the third and fourth display modules 100-3 and 100-4).

As described above, to transmit the x-coordinate value, the processor 140 transmits data including the address information and the x-coordinate value corresponding to the third display module 100-3 to the third display module 100-3 through the third communication interface 130. Also, the processor 140 transmits data including the address information and the y-coordinate value corresponding to the fourth display module 100-4 to the fourth display module 100-4 through the third communication interface 130.

Although it has been described that the processor 140 transmits the x-coordinate value to the third display module 100-3 and then transmits the y-coordinate value to the fourth display module 100-4, embodiments are not limited thereto and the transmission order of the coordinate values may be changed. It is noted, however, that the processor 140 cannot simultaneously transmit the x-coordinate value and the y-coordinate value, but sequentially transmit the x-coordinate value and the y-coordinate value due to the characteristics of I2C communication method.

According to an embodiment, the first direction may be a direction opposite to the third direction on the x-axis of the x-y plane in which the plurality of display modules are arranged, and the second direction may be a direction opposite to the fourth direction on the y-axis of the x-y plane in which the plurality of display modules are arranged. In this case, the display module 100 may be a display module 100 adjacent to each of the first to fourth display modules 100-4.

In some embodiments, the processor 140 receives the x-coordinate value of the first display module 100-1 from the first display module 100-1 located in the first direction of the display module 100, and after identifying the x-coordinate of the display module 100 based on the received x-coordinate value of the first display module 100-1, the processor 140 transmits the x-coordinate of the display module 100 to the third display module 100-3 located in the third direction opposite to the first direction on the X axis. As such, the transmission/reception direction of the coordinate values between the display modules for setting the coordinates of each of the plurality of display modules is performed in one direction and not in both directions.

When the processor 140 receives the y-coordinate value of the second display module 100-2 from the second display module 100-2 located in the second direction of the display module 100, and after identifying the y-coordinate of the display module 100 based on the received y-coordinate value of the display module 100-2, the processor 140 transmits x, y coordinates of the display module 100 to the fourth display module 100-4 located in the fourth direction opposite to the second direction on the y-axis. As such, like the x-coordinate value, the y-coordinate value is also transmitted and received between the display modules in one direction.

Accordingly, when the identified coordinate values of the display module 100 are transmitted to the third display module 100-3 and the fourth display module 100-4, the processor 140 does not receive coordinate values of the third display module 100-3 and the fourth display module 100-4 even if setting of the respective coordinate values of the third display module 100-3 and the fourth display module 100-4 (e.g., the coordinate value of the third display module 100-3 and the coordinate value of the fourth display module 100-4) is completed.

Figure 5:
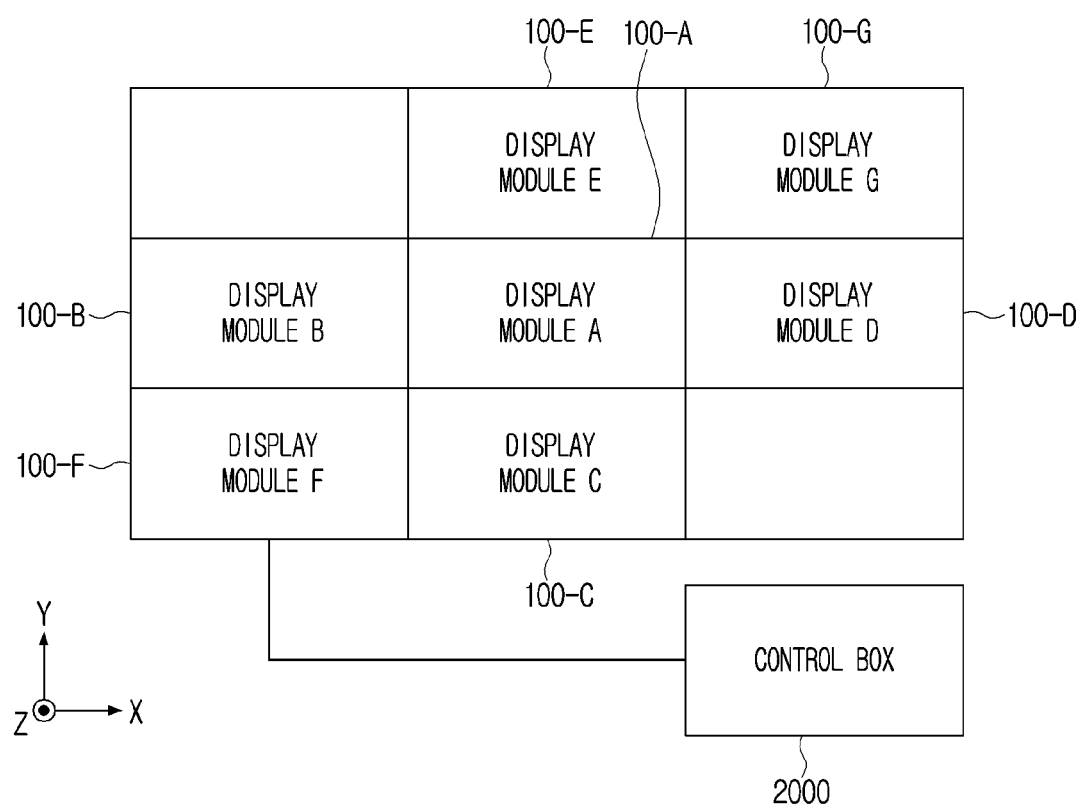
FIG. 5 is a diagram illustrating automatic coordinate setting of a display module according to an embodiment.

FIG. 5 is a diagram illustrating automatic coordinate setting of a display module according to an embodiment.

According to an embodiment, a first direction may be a leftward direction of a display module, a second direction may be a downward direction of the display module, a third direction may be a rightward direction of the display module, and a fourth direction may be an upward direction of the display module.

Therefore, as described above, according to an embodiment, the first to fourth display modules 100-1 to 100-4 may be relatively determined according to the position of the display module 100. Referring to FIG. 5, the display module B 100-B corresponding to the first display module 100-1 located in the leftward direction (e.g., the first direction) with respect to the display module A 100-A corresponds to the fourth display module 100-4 located in the upward direction (e.g., the fourth direction) with respect to the display module F 100-F. As such, the first to fourth display modules 100-1 to 100-4 are relatively determined according to the respective display modules and the positions in which the display modules are arranged.

Figure 6:
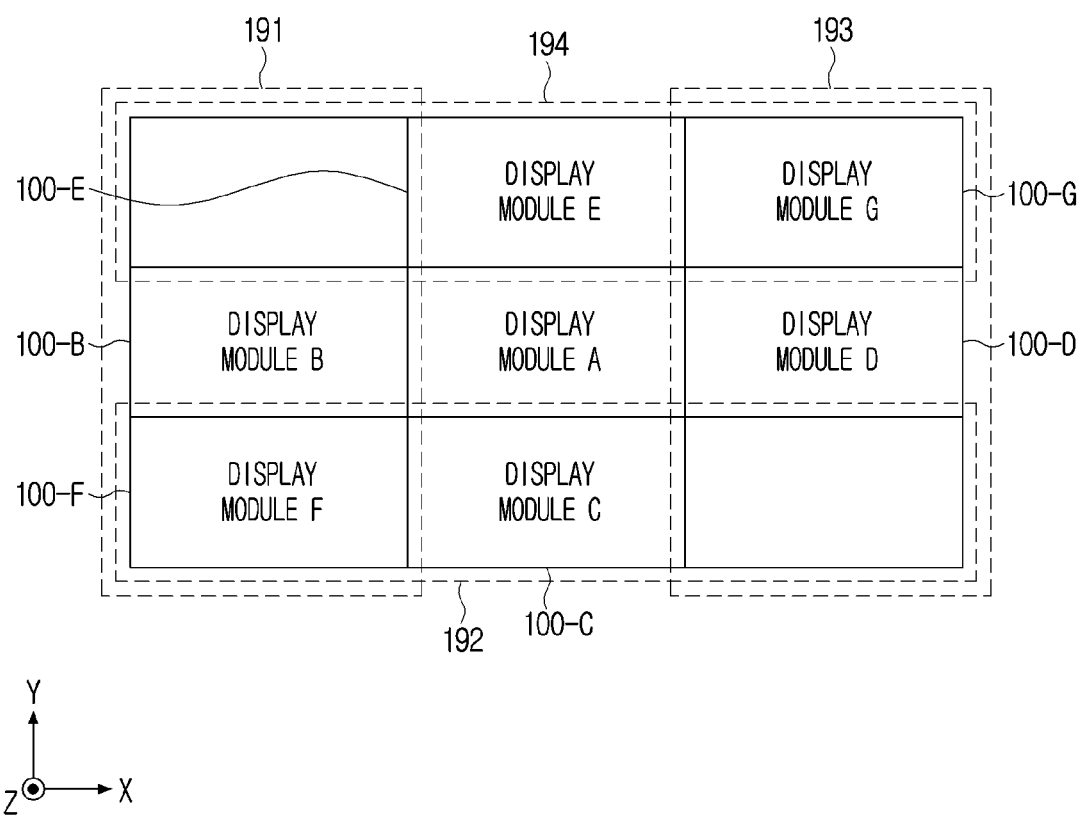
FIG. 6 is a diagram illustrating a difference between the number of display modules as master devices receiving coordinate values of other display modules to identify a coordinate value and a difference between the numbers of display modules as slave devices transmitting an identified coordinate value according to positions of various display modules according to an embodiment.

FIG. 6 is a diagram illustrating a difference between the number of display modules as master devices receiving coordinate values of other display modules to identify a coordinate value and a difference between the numbers of display modules as slave devices transmitting an identified coordinate value according to positions of various display modules according to an embodiment.

Referring to FIG. 6, in the modular display device, in the case of a plurality of display modules (hereinafter, referred to as a first type display module 191) disposed on the leftmost side, since the first display module 100-1 is not disposed in the first direction, e.g., in the leftward direction of each display module, the first type display module 191 cannot receive an x coordinate value of the first display module 100-1 from the first display module 100-1. In addition, referring to FIG. 6, in the modular display device, in the case of a plurality of display modules (hereinafter, referred to as a second type display module 192) disposed on the lowermost side, since the display module 100-2 is not disposed in the second direction, e.g., in the downward direction of each display module, the second type display module 192 cannot receive a y coordinate value of the second display module 100-2 from the second display module 100-2. Accordingly, an x coordinate and a y coordinate of each of the first-type display module 191 and the second-type display module 192 are set based on predetermined basic coordinate values. This will be described below in more detail.

The display module may correspond to a plurality of types, e.g., a first type of display module and second type of display module. Referring to FIG. 6, the display module F 100-F corresponds to the first type and second type display modules because the first display module 100-1 disposed in the leftward direction, which is the first direction, and the second display module 100-2 disposed in the downward direction, which is the second direction, do not exist. In this case, the coordinate value of the display module F 100-F may be set as a predetermined basic coordinate value.

According to an embodiment, the processor 140 may transmit the identified coordinate value of a display module to only one of the third display module 100-3 and the fourth display module 100-4 according to an arrangement position of the display module. For instance, the processor 140 may transmit the x-coordinate value of the display module 100 to the third display module 100-3 or transmit the y-coordinate value of the display module 100 to the fourth display module 100-4.

Referring to FIG. 6, in the modular display device, in the case of a plurality of display modules (hereinafter, referred to as a third type display module 193) arranged on the rightmost side, since the third display module 100-3 is not disposed in the third direction, e.g., in the rightward direction, of each display module, the x coordinate value of the display module cannot be transmitted. In addition, referring to FIG. 6, in the modular display device, in the case of a plurality of display modules (hereinafter, referred to as a fourth type display module 194) arranged on the uppermost side, since the fourth display module 100-4 is not disposed in the fourth direction, e.g., in the upward direction, of each display module, the y coordinate value of the display module cannot be transmitted. As described above, like the first type and the second type, the display module may correspond to a plurality of types, e.g., third type and fourth type display modules. Referring to FIG. 6, a display module G 100-G disposed on the upper rightmost side may correspond to the third type display module 193 and the fourth type display module 194 because the third display module 100-3 disposed in the rightward direction, which is the third direction, and the fourth display module 100-4 disposed in the upward direction, that is, the fourth direction, do not exist.

FIGS. 7A, 7B, 7C, 7D, and 7E are diagrams illustrating coordinate setting of a plurality of display modules configuring a modular display device according to an embodiment.

According to an embodiment, a reference display module 200 for starting coordinate setting, among a plurality of display modules, may be set. When a command regarding coordinate setting is received from the control box 2000, the reference display module 200 identifies coordinates of the reference display module, and then transmits an x-coordinate value and a y-coordinate value of the reference display module to the third and fourth display modules 100-3 and 100-4. The reference display module 200 may be a display module belonging to the first and second type display modules 191 and 192 described above. As described above, in the case of display modules corresponding to the first and second type display modules 191 and 192 at the same time, the coordinate value of the corresponding display module may be identified, even without receiving the coordinate values of the first display module 100-1 and the second display module 100-2.

According to an embodiment, a value obtained by adding the x-coordinate value received from the first display module 100-1 to a basic x-coordinate value of the display module may be identified as an x-coordinate value of the display module, and a value obtained by adding the y-coordinate value received from the second display module 100-2 to a basic y-coordinate value of the display module may be identified as a y-coordinate value of the display module.

For instance, the basic coordinate values (e.g., a basic x-coordinate value and a basic y-coordinate value) may be set in each display module. In this case, the basic coordinate values (e.g., the basic x-coordinate value and the basic y-coordinate value) may be set to the same value in each of the plurality of display modules.

Figure 7A:
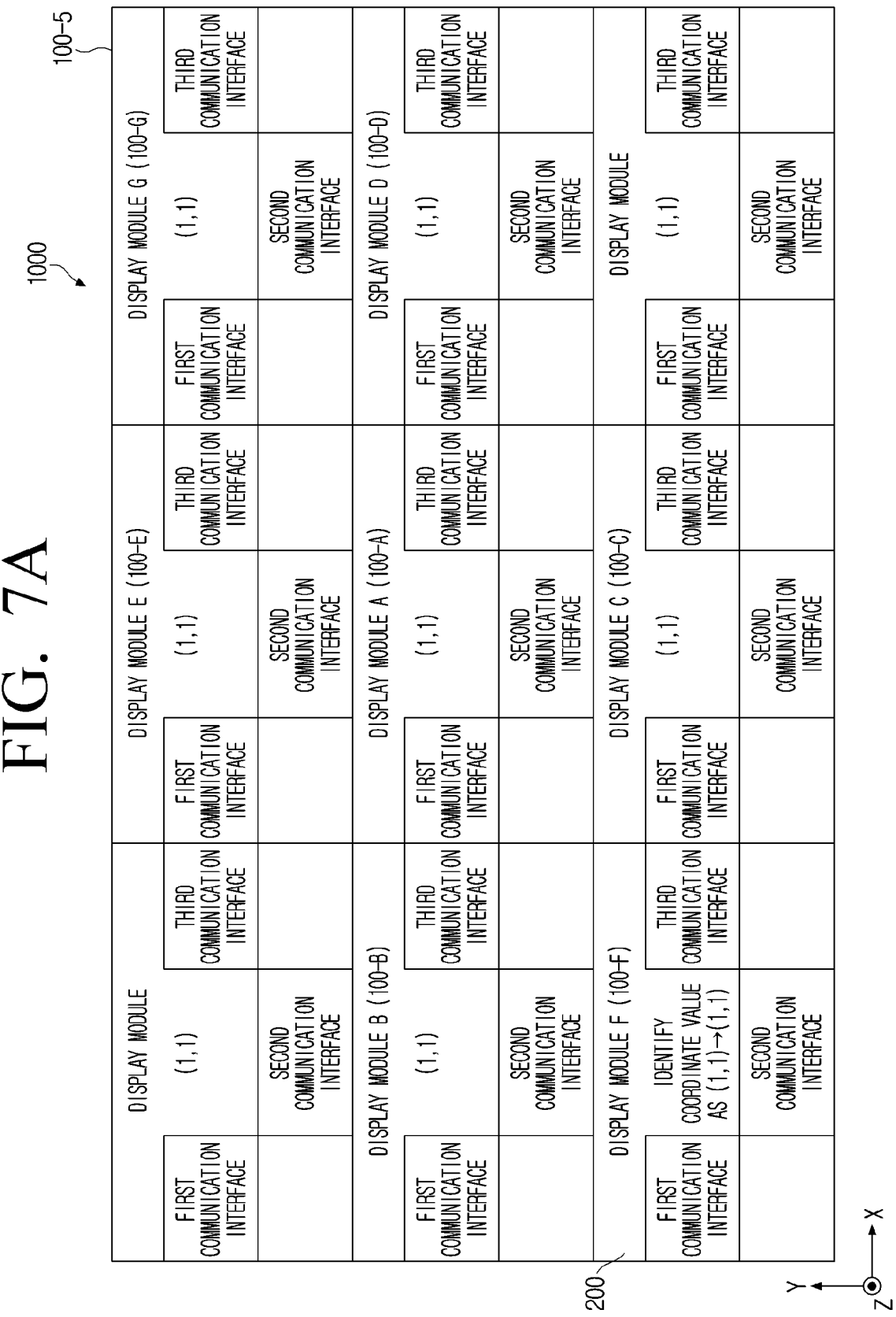
FIGS. 7A, 7B, 7C, 7D, and 7E are diagrams illustrating coordinate setting of a plurality of display modules configuring a modular display device according to an embodiment.

Referring to FIG. 7A, the basic coordinate values of the plurality of display modules configuring the modular display device 1000 are equally set to (1, 1). Here, when the display module F 100-F, which is a reference display module 200, receives a command regarding coordinate setting from the control box, the processor of the display module F 100-F identifies (1, 1), which is a basic coordinate value, as a coordinate value of the display module F 100-F. The reference display module 200 may receive a command regarding coordinate setting from the control box 2000 through a separate communication unit instead of the first to third communication interfaces 110 to 130.

Figure 7B:
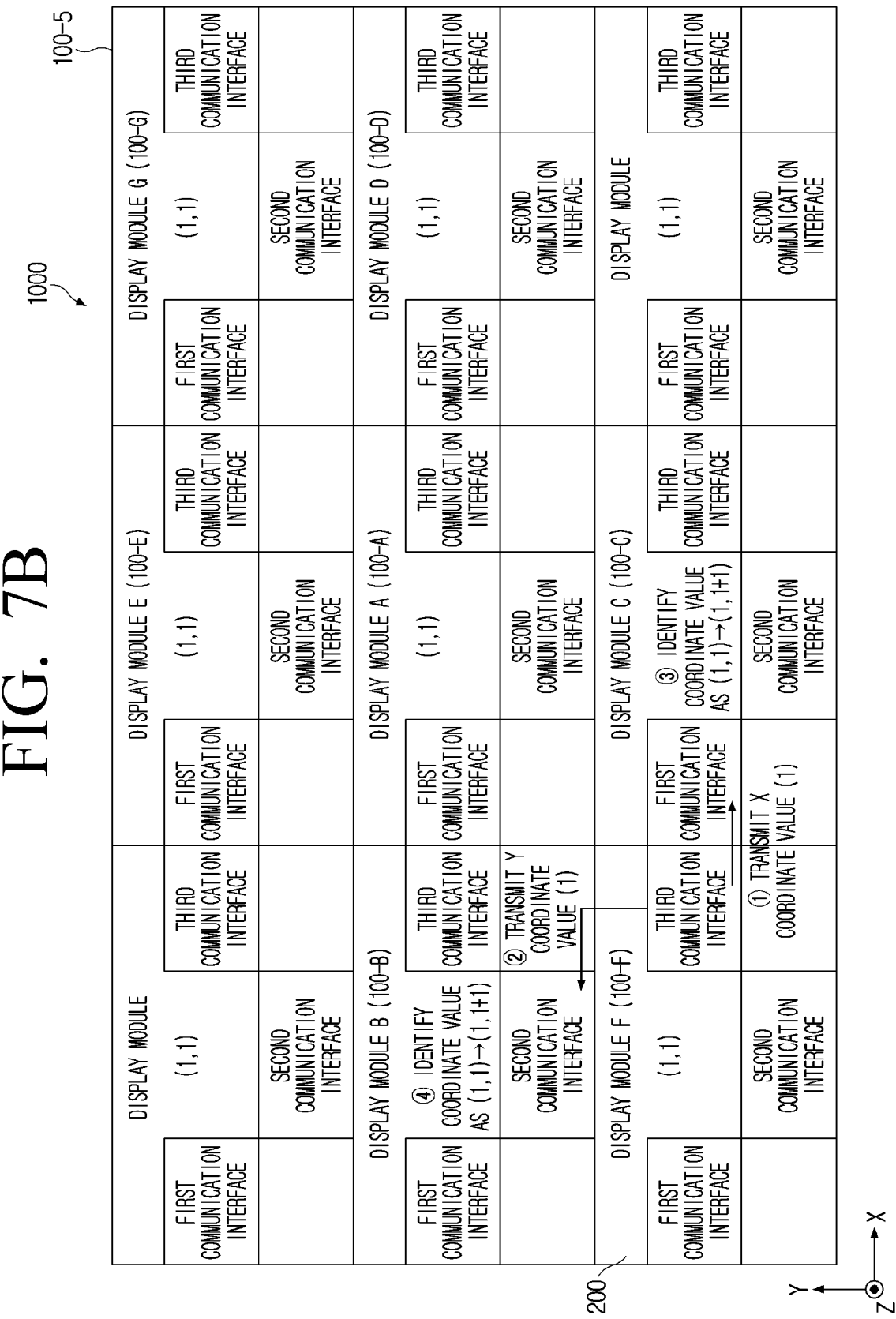

Referring to FIG. 7B, the processor of the display module F 100-F transmits the x-coordinate value (1) of the coordinate values (1, 1) of the display module F 100-F to the display module C 100-C located in the rightward direction of the display module F 100-F through the third communication interface 130 of the display module F 100-F. Also, the processor of the display module F 100-F transmits the y-coordinate value (1) of the coordinate values (1, 1) of the display module F 100-F to the display module B 100-B located in the upward direction of the display module F 100-F through the third communication interface 130 of the display module F 100-F.

A processor of the display module B 100-B receiving the y-coordinate value of the display module F 100-F from the display module F 100-F, which is the reference display module 200, identifies a coordinate value of the display module B 100-B based on the received y-coordinate value of the display module F 100-F and the basic coordinate value. For instance, the processor of the display module B 100-B identifies the y-coordinate value of the display module B 100-B based on the received y-coordinate value of the display module F 100-F and the basic y-coordinate value and identifies the x-coordinate value of the display module B 100-B based on the basic x coordinate value. For example, the processor of the display module B 100-B identifies, as they coordinate value of the display module B 100-B, 2 obtained by adding the y coordinate value 1 of the display module F 100-F corresponding to the second display module 100-2 of the display module B 100-B to the basic y coordinate value 1. Accordingly, the processor of the display module B 100-B identifies the coordinate value of the display module B 100-B as (1, 2).

A processor of the display module C 100-C receiving the x-coordinate value of the display module F 100-F from the display module F 100-F, which is the reference display module 200, identifies a coordinate value of the display module C 100-C based on the received x-coordinate value of the display module F 100-F and the basic coordinate value. For instance, the processor of the display module C 100-C identifies the x-coordinate value of the display module C 100-C based on the received x-coordinate value of the display module F 100-F and the basic x-coordinate value and identifies the y-coordinate value of the display module C 100-C based on the basic y coordinate value. For example, the processor of the display module C 100-C identifies, as the x coordinate value of the display module C 100-C, 2 obtained by adding the x coordinate value 1 of the display module F 100-F corresponding to the first display module 100-1 of the display module C 100-C to the basic x coordinate value 1. Accordingly, the processor of the display module C 100-C identifies the coordinate value of the display module C 100-C as (2, 1).

Figure 7C:
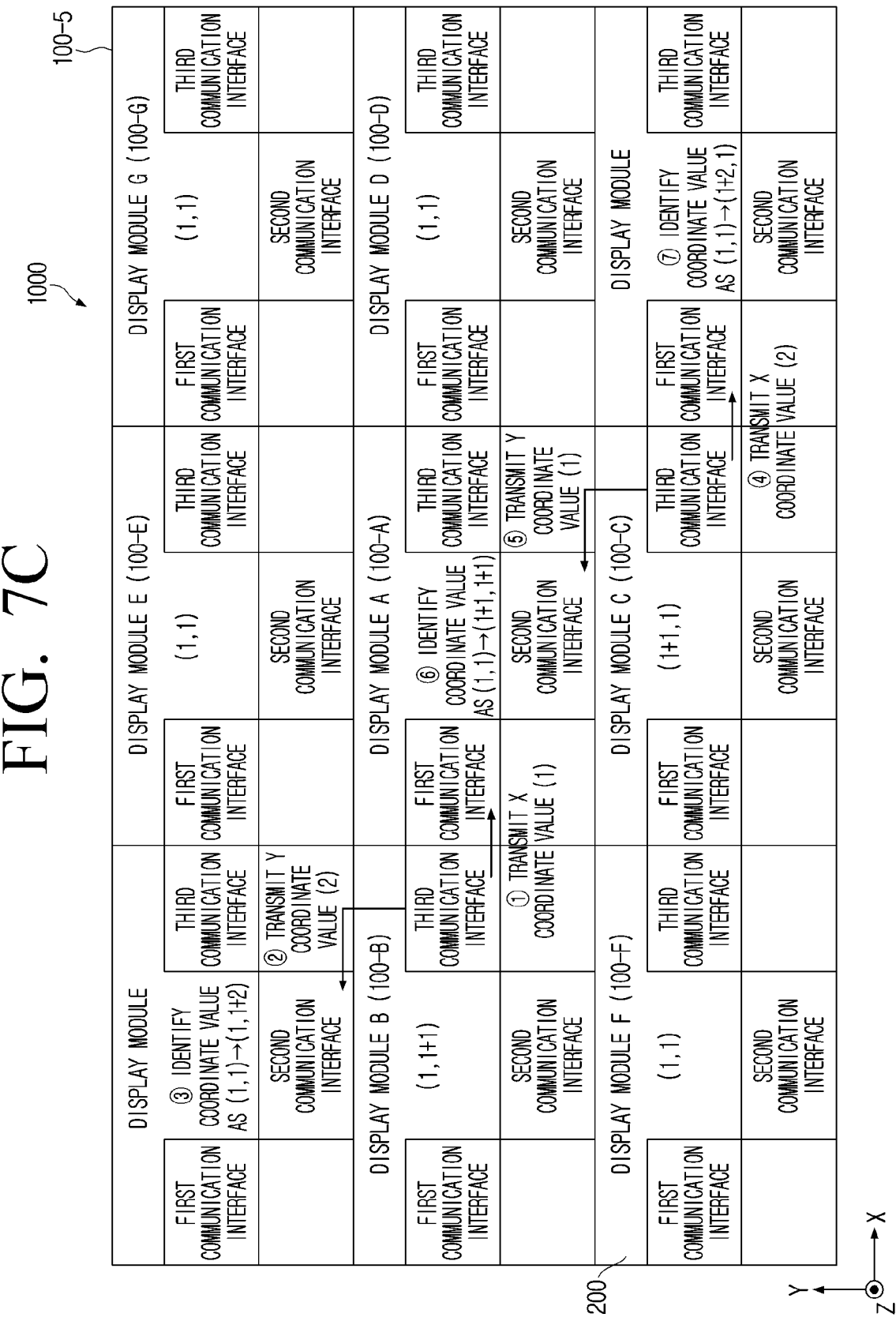

Referring to FIG. 7C, after identifying the coordinate value of the display module B 100-B as (1, 2), the processor of the display module B 100-B transmits the x coordinate value 1 of the display module B 100-B to the display module A 100-A, which is a third display module 100-3, disposed on the rightward direction with respect to the display module B 100-B, through the third communication interface 130 of the display module B 100-B. Also, the processor of the display module B 100-B transmits the y coordinate value 2 of the display module B 100-B to the fourth display module 100-4 disposed in the upward direction with respect to the display module B 100-B through the third communication interface 130 of the display module B 100-B.

Also, referring to FIG. 7C, after identifying the coordinate value of the display module C 100-C as (2, 1), the processor of the display module C 100-C transmits the y-coordinate value 1 of the display module C 100-C to the display module A 100-A, which is the fourth display module 100-4 disposed in the upward direction with respect to the display module C 100-C, through the third communication interface 130 of the display module C 100-C. Also, the processor of the display module C 100-C transmits the x coordinate value 2 of the display module C 100-C to the third display module 100-3 disposed in the rightward direction with respect to the display module C 100-C through the third communication interface 130 of the display module C 100-C.

Referring to FIG. 7C again, a processor of the display module A 100-A receives an x coordinate value of the display module B 100-B from the display module B 100-B through the first communication interface 110 of the display module A 100-A. Also, the processor of the display module A 100-A receives a y coordinate value of the display module C 100-C from the display module C 100-C through the second communication interface 120 of the display module A 100-A. Also, the processor of the display module A 100-A identifies a coordinate value of the display module A 100-A based on the received information (e.g., the x coordinate value of the display module B 100-B and the y coordinate value of the display module C 100-C) and the basic coordinate value. For instance, the processor of the display module A 100-A identifies, as an x coordinate value of the display module A 100-A, a value obtained by adding the x coordinate value 1 of the display module B 100-B to the basic x coordinate value 1. Also, the processor of the display module A 100-A identifies, as a y coordinate value of the display module A 100-A, a value obtained by adding 1, which is the y-coordinate value of the display module C 100-C, to the basic y-coordinate value 1. As such, the processor of the display module A 100-A identifies the coordinate value of the display module A 100-A as (2, 2).

Figure 7D:
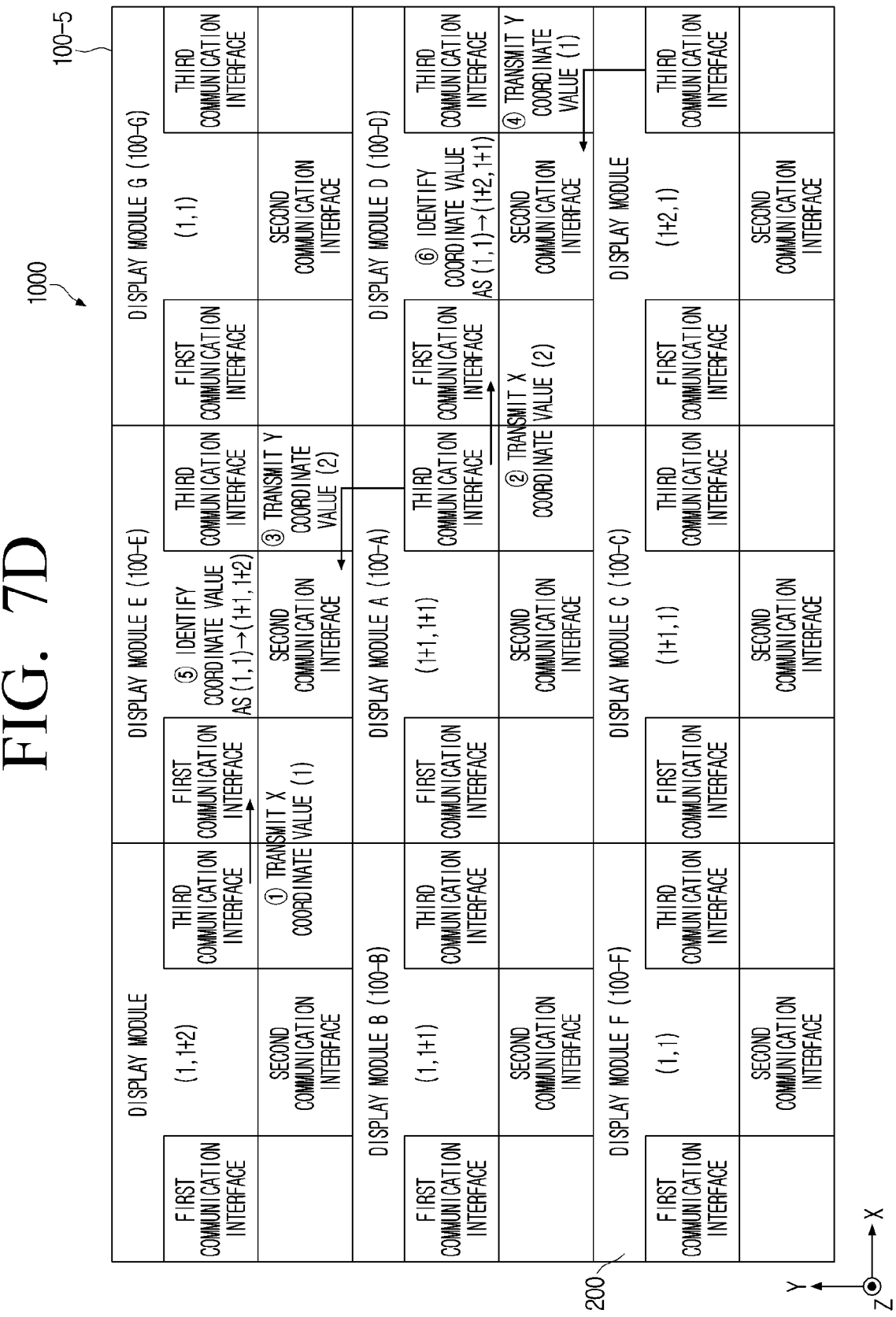

Referring to FIG. 7D, the processor of the display module A 100-A transmits the x-coordinate value of the display module A 100-A to the display module D 100-D, which is the third display module 100-3 disposed in the rightward direction with respect to the display module A 100-A, through the third communication interface 130. Also, the processor of the display module A 100-A transmits the y-coordinate value of the display module A 100-A to the display module E 100-E, which is the fourth display module 100-3 disposed in the upward direction with respect to the display module A 100-A.

Figure 7E:
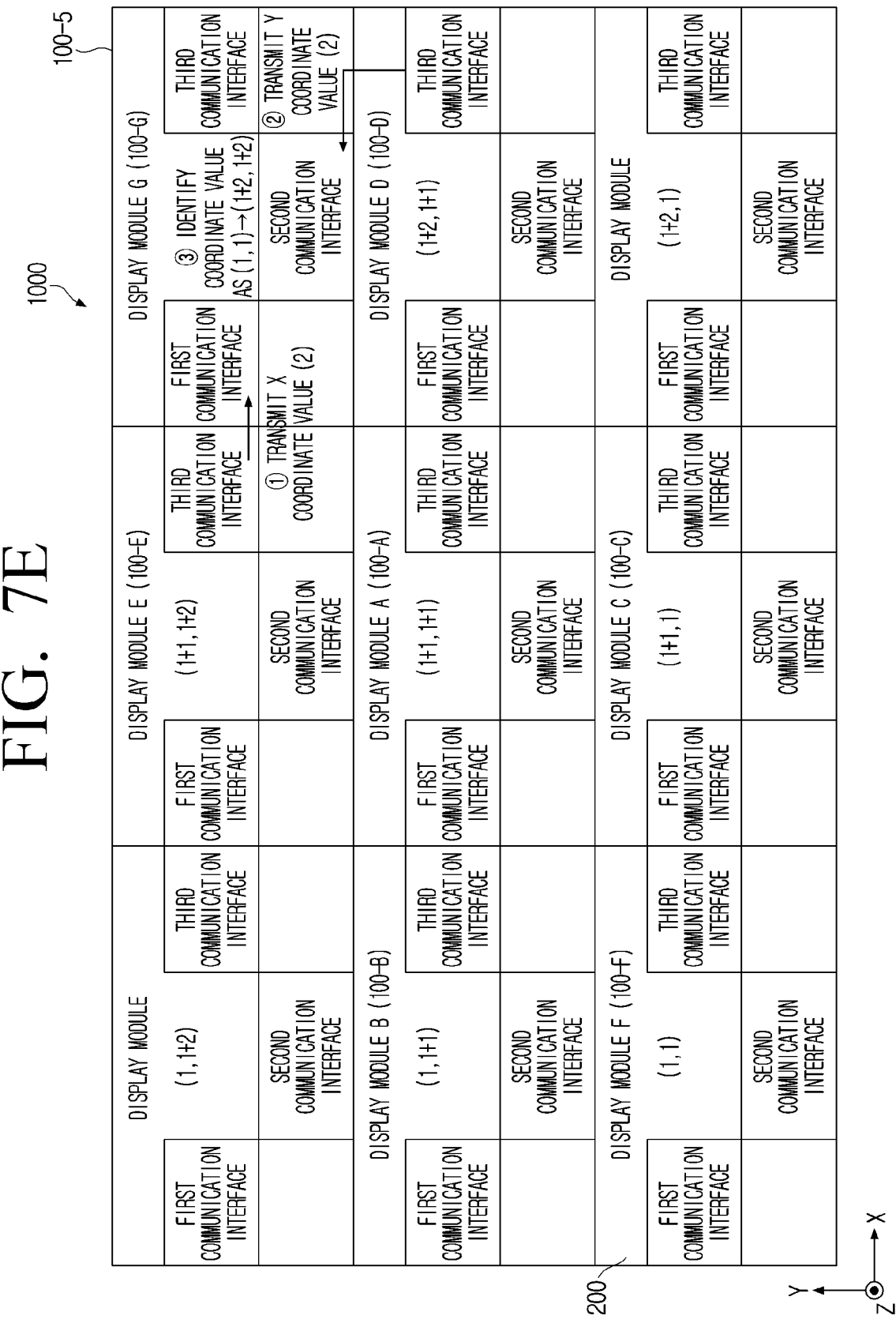

Referring to FIG. 7E, in this manner, each display module receives the x-coordinate value of the first display module 100-1 with respect to each display module through the first communication interface 110 of each display module and receives the y-coordinate value of the second display module 100-2 with respect to each display module through the second communication interface 120 of each display module. Also, each display module identifies the coordinate value of the display module based on the basic coordinate value set to be the same and the received coordinate value information, and then transmits the identified x coordinate value of the display module to the third display module 100-3 with respect to each display module through the third communication interface 130 of each display module and transmits the identified y coordinate value of the display module to the fourth display module 100-4 with respect to each display module through the third communication interface 130 of each display module. Through the process of identifying the coordinates of each display module and the process of transmitting and receiving coordinate values, the modular display device 1000 may automatically identify the coordinates of all display modules configuring the modular display device 1000.

Figure 8:
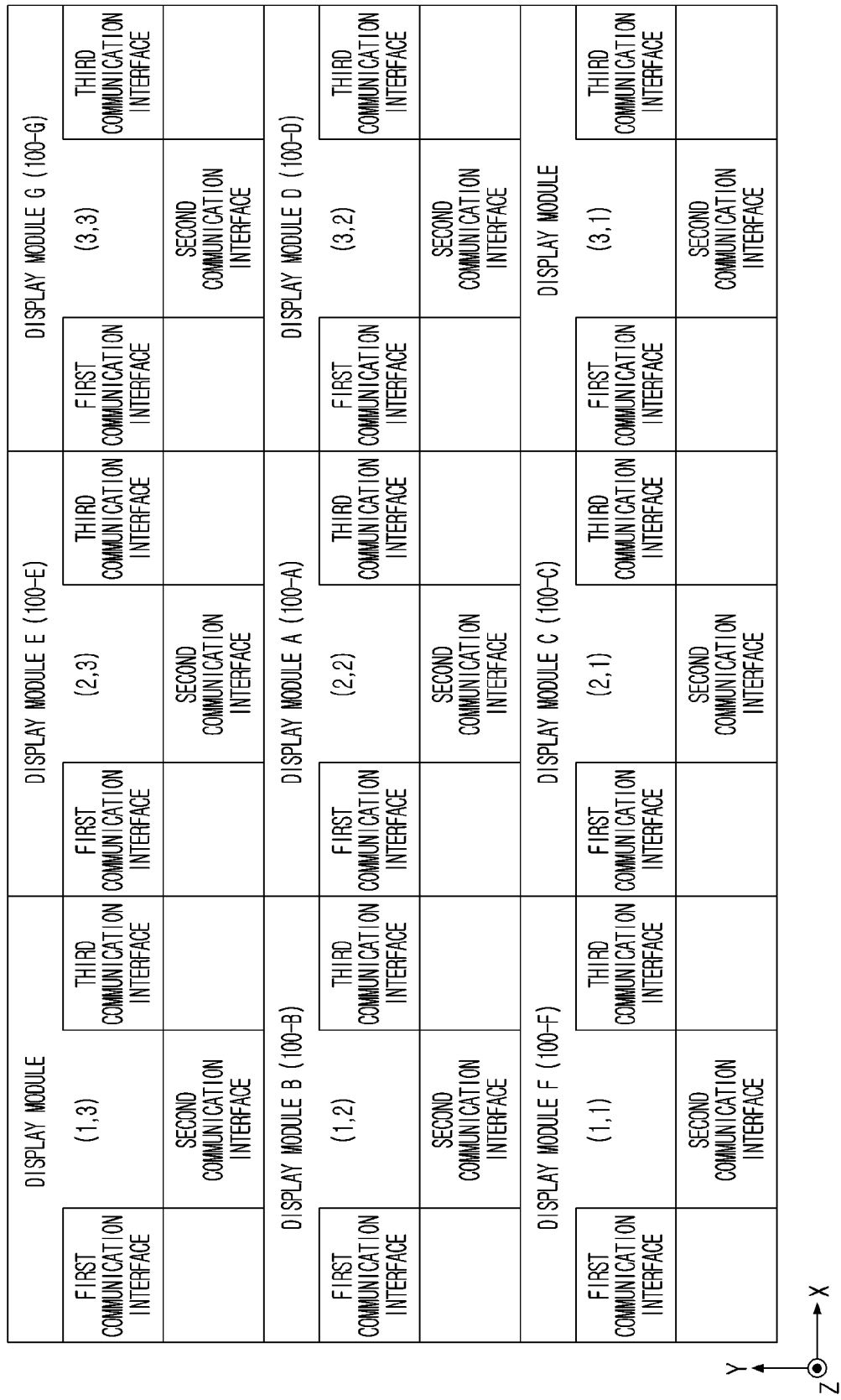
FIG. 8 is a diagram illustrating completion of coordinate setting of a plurality of display modules configuring a modular display device according to an embodiment.

FIG. 8 is a diagram illustrating completion of coordinate setting of a plurality of display modules configuring a modular display device according to an embodiment.

Referring to FIG. 8, through the process of identifying coordinates of the display module and the process of transmitting and receiving coordinate values described above with reference to FIGS. 7A to 7E, each display module sets coordinate values corresponding to an arrangement position not to overlap each other.

According to an embodiment, the first direction, the second direction, the third direction, and the fourth direction may be set according to the position of the reference display module among the plurality of display modules configuring the modular display device 1000. For example, referring to FIG. 7A, in the form of a matrix (3×3) in which a plurality of display modules is disposed, when a display module G 100-G located on the upper rightmost side is set as the reference display module, a coordinate identification direction of the display module in the modular display device 1000 may be set to a downward leftward direction. Also, the first direction may be set to a rightward direction of the display module, the second direction may be set to an upward direction of the display module, the third direction may be set to a leftward direction of the display module, and the fourth direction may be set to a downward direction of the display module.

According to an embodiment, when the setting of coordinate information of all the plurality of display modules configuring the modular display device 1000 is complete, each display module may perform an identification value (ID) setting process. In this case, the ID refers to an identification value for identifying each display module.

Hereinafter, an embodiment in which each display module identifies an ID is described in more detail.

The processor 140 may identify an ID of the display module 100 based on the identified coordinate value of the display module 100. In this case, the ID identification process of the processor 140 is performed after the coordinate identifying process of all the display modules configuring the modular display device 1000 is complete. Therefore, before describing an embodiment of the disclosure for the ID identification process, a method of determining that the coordinate identifying process of all the display modules is complete is described in more detail.

A fifth display module 100-5 refers to a display module that lastly performs coordinate identification among a plurality of display modules implementing the modular display device 1000.

In this case, according to an embodiment, the fifth display module 100-5 may be a display module located on the uppermost right side, among the plurality of display modules when the first direction is a leftward direction of the display module, the second direction is a downward direction of the display module, the third direction is a rightward direction of the display module, and the fourth direction is an upward direction of the display module. For instance, referring to FIGS. 7A to 7E, a reference display module 200, among a plurality of display modules, is set to the display module F 100-F, and when the first direction is a leftward direction of the display module, the second direction is a downward direction of the display module, the third direction is a rightward direction of the display module, and the fourth direction is an upward direction of the display module, the coordinate value of the display module G 100-G positioned on the uppermost right side is finally identified, and thus, the display module G 100-G corresponds to the fifth display module 100-5.

Referring back to FIG. 6, when the first direction is a leftward direction of the display module 100, the second direction is a downward direction of the display module 100, the third direction is a rightward direction of the display module 100, and the fourth direction is an upward direction of the display module 100, the third display module 100-3 disposed in the rightward direction, which is the third direction, and the fourth display module 100-4 disposed in the upward direction, which is the fourth direction, may correspond to the fifth module 100-5 as a display module which does not exist. The reason is because, when the display module adjacent in the rightward direction and the display module adjacent in the upward direction does not exist for the display module 100, there is no other display module to which, after identifying the coordinate value of the display module, the processor 140 may transmit a coordinate value of the display module 100 identified based on the coordinate value of the first display module 100-1 disposed in the leftward direction as the first direction and the coordinate value of the second display module 100-2 disposed in the downward direction as the second direction. Accordingly, when the first direction is a leftward direction of the display module 100, the second direction is a downward direction of the display module 100, the third direction is a rightward direction of the display module 100, and the fourth direction is an upward direction of the display module 100, the display module 100 that simultaneously corresponds to the third type display module 193 and the fourth type display module 194 may correspond to the fifth display module 100-5.

As for the example described above, referring to FIG. 7A, when the display module G 100-G located at the uppermost right side is set to a reference display module in the form of a matrix (3×3) in which a plurality of display modules are arranged and when the first direction is a rightward direction of the display module, the second direction is an upward direction of the display module, the third direction is a leftward direction of the display module, and the fourth direction is an downward direction of the display module, the display module F 100-F may correspond to the fifth display module 100-5.

Referring back to FIG. 7E, after identifying the coordinate value of the display module G 100-G, the processor of the display module G 100-G located on the uppermost right side corresponding to the fifth display module 100-5 cannot transmit the coordinate value of the display module G 100-G through the third communication interface 130. This is because, as described above, there is no display module disposed on the right side of the display module G and no display module disposed on the upper side of the display module G.

Therefore, the processor of the display module G 100-G cannot receive an Ack signal, which is a response signal that may be received when the coordinate value of the display module G 100-G is transmitted to the third or fourth display modules 100-3 or 100-4 with respect to the display module G 100-G through the third communication interface 130. In addition, the processor of the display module G 100-G cannot receive a Nack signal, which is received when slave address information in data transmitted by a master device does not match address information of a device receiving the data.

Therefore, according to an embodiment, when the processor 140 of the display module 100 does not receive the Ack signal, which is a response signal, through the third communication interface 130 for a predetermined time, the processor 140 of the display module 100 identifies that the coordinate identifying process of all the display modules has terminated and identifies that the display module 100 corresponds to the fifth display module 100-5. The processor 140 then switches to an ID identification process.

Meanwhile, IDs that do not overlap each other should be set for each display module. In this case, to control the modular display device 1000, each of a plurality of display modules implementing the modular display device 1000 should be controlled and the control box 2000 may identify each display module based on an ID corresponding to each display module. Therefore, a non-overlapping ID should be set for each display module.

To this end, in an embodiment, the ID of each display module may be set based on the coordinate value of the fifth display module 100-5 and the coordinate value of each display module. Also, in an embodiment, as the coordinates of the plurality of display modules are automatically set based on the I2C communication method, IDs of the plurality of display modules may be automatically set based on the I2C communication method. Hereinafter, an embodiment related thereto is described in more detail.

According to an embodiment, when the x coordinate value of the fifth display module 100-5 located at a corner portion of the modular display device 1000 is received through the third communication interface 130 from at least one of the third display module 100-3 and the fourth display module 100-4, the processor 140 may identify an ID of the display module 100 based on the x coordinate value of the fifth display module 100-5 and the x, y coordinate value of the display module 100.

The processor 140 may set the ID of the display module 100 based on the x coordinate value of the fifth display module 100-5 and the coordinate value of the display module 100. The processor 140 may set the ID of the display module 100 that does not overlap with other display modules using the coordinate value of the display module 100 for ID setting. This is because, as described above, each display module sets the coordinate values of the display module so as not to overlap with other display modules.

In some embodiments, the x-coordinate value of the fifth display module 100-5 is also used for ID setting. However, embodiments are not limited thereto, and for ID setting, the y-coordinate or both the x-coordinate and the y-coordinate of the fifth display module 100-5 may be used. In some embodiments, the processor 140 receives the same x-coordinate value of the fifth display module 100-5 from the third display module 100-3 and the fourth display module 100-4. This is contrary to the coordinate identifying process in which the processor 140 receives different types of information, e.g., an x-coordinate value from the first display module 100-1 and a y-coordinate value from the second display module 100-2.

The processor 140 receives the x coordinate value of the fifth display module 100-5 from the third display module 100-3 and the fourth display module 100-4 through the third communication interface 130. For example, the display module 100 receives data including the x coordinate value of the fifth display module 100-5 from at least one of the third display module 100-3 and the fourth display module 100-4 through the third communication interface 130. Then, the processor 140 identifies whether address information included in the received data matches an address of the display module 100. When it is identified as matching, the display module transmits an Ack signal to the third display module 100-3 or the fourth display module 100-4 that has transmitted the corresponding data. In this case, the address of the display module 100 set for the third display module 100-3 and the address of the display module 100 set for the fourth display module 100-4 may be different. For example, the display module 100 may be assigned an address set to correspond to the first communication interface 110 of the third display module 100-3 with respect to the third display module 100-3 and may be assigned an address set to correspond to the second communication interface 120 of the fourth display module 100-4 with respect to the fourth display module 100-4. As a result, the address information used by the display module 100 to operate as a slave device may include four address information received from the first to fourth display modules, respectively. For instance, the display module 100 may include first address information given from the first display module 100-1 used to operate as a slave device when setting coordinates, second address information given from the second display module 100-2, third address information given from the third display module 100-3 used to operate as a slave device in ID setting, and fourth address information given from the fourth display module 100-4.

The third communication interface 130 used to transmit the x-coordinate value and the y-coordinate value as the display module 100 operates as a master device in the coordinate setting process. However, in the ID setting process, the third communication interface 130 is used to receive the x-coordinate value of the fifth display module 100-5 as the display module 100, and as such, operates as a slave device.

In addition, when identifying of the ID of the display module 100 is complete, the x-coordinate value of the fifth display module 100-5 is transmitted to the first display module 100-1 located in the first direction through the first communication interface 110 and the second display module 100-2 located in the second direction through the second communication interface 120. For example, in the coordinate setting process, the first and second communication interfaces 110 and 120, which were used by the display module 100 as a slave device to receive data (e.g., the x coordinate value of the first display module 100-1 and the y coordinate value of the second display module 100-2), are used to transmit data (e.g., the x coordinate value of the fifth display module 100-5).

To this end, according to an embodiment, the first to third communication interfaces 110 to 130 may be interfaces enabling dual I2C communication. For instance, the processor 140 may change the use of the first to third communication interfaces 110 to 130 according to the role of the master device or the slave device of the display module 100.

However, embodiments are not limited thereto, and according to another embodiment, an I2C communication interface for coordinate identification and an I2C communication interface for ID identification may be distinguished from each other. For instance, the display module 100 may include an I2C chip including an interface (e.g., the first to third communication interfaces 110 to 130) for coordinate identification and an I2C chip including an interface (e.g., fourth to sixth communication interfaces) for separate ID identification. In this case, the display module 100 receives the X coordinate value of the fifth display module 100-5 from the third display module 100-3 or the fourth display module 100-4 through the fourth communication interface. Also, the ID of the display module 100 is identified based on the x coordinate value of the fifth display module 100-5 and the x, y coordinate value of the display module 100. When identifying of the ID of the display module 100 is complete, the X coordinate information of the fifth display module 100-5 is transmitted to the first display module 100-1 through the fifth communication interface and is transmitted to the second display module 100-2 through the sixth communication interface.

Figure 9:
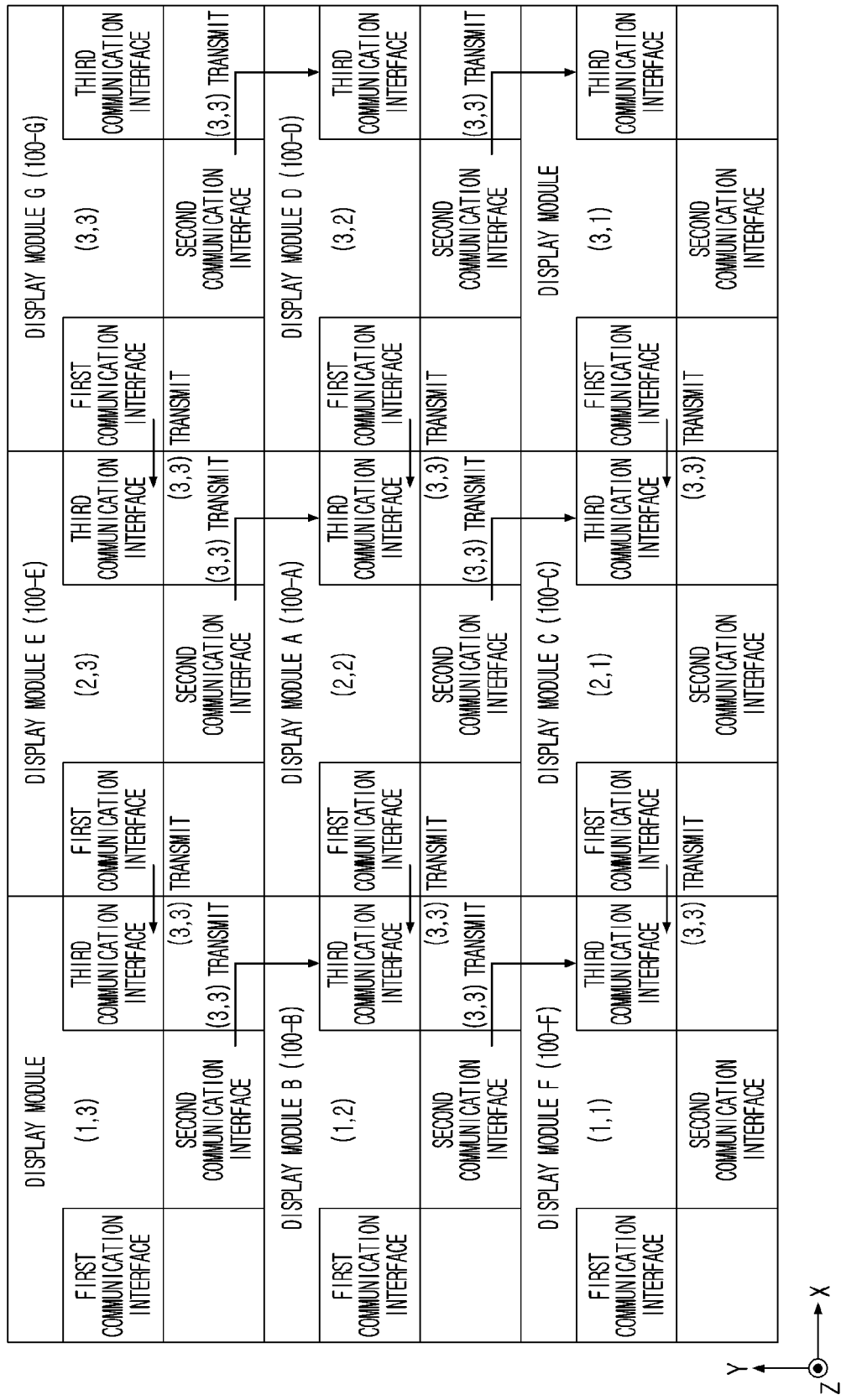
FIG. 9 is a diagram illustrating setting of identification of a plurality of display modules in a modular display device according to an embodiment.

FIG. 9 is a diagram illustrating setting of identifications value of a plurality of display modules in a modular display device according to an embodiment.

According to an embodiment, when the x coordinate value of the fifth display module 100-5 is received from at least one of the third display module 100-3 and the fourth display module 100-4, the processor may identify an ID of the display module based on Equation 1 provided below.

$$ID=(y-1)*X+x \qquad \text{Equation 1}$$

Here, ID is the ID of the display module, X is the x-coordinate value of the fifth display module 100-5, x is the x-coordinate value of the display module, and y is the y-coordinate value of the display module.

Referring to FIG. 9, the processor of the display module G 100-G corresponding to the fifth display module 100-5 identifies a coordinate value of the fifth display module 100-5 as (3, 3) and subsequently identifies that the coordinate identifying process for the entire modular display device 1000 is complete. Also, the processor of the display module G 100-G sets an ID of the display module G 100-G corresponding to the fifth display module 100-5. Here, the ID of the fifth display module 100-5 is identified as 9 ((3−1)*3+3). Also, when the identifying of the ID of the fifth display module 100-5 is complete, the processor of the display module G 100-G transmits the x coordinate value 3 of the fifth display module 100-5 to the display module E 100-E located in the leftward direction of the display module G 100-G through the first communication interface 110 of the display nodule G 100-G. Also, the processor of the display module G 100-G transmits the x coordinate value 3 of the fifth display module 100-5 to the display module D 100-D located in the downward direction of the display module G 100-G through the second communication interface 120 of the display module G 100-G. Also, the processor of the display module E 100-E identifies the ID based on the received x-coordinate value of the fifth display module 100-5 and the coordinate value of the display module E 100-E. For example, since the coordinate value of the display module E 100-E corresponds to (2, 3), the processor of the display module H 100-H identifies the ID of the display module E 100-E as 8 ((3)−1)*3+2). The processor of the display module D 100-D also identifies the ID based on the received x-coordinate value of the fifth display module 100-5 and the coordinate value of the display module D 100-D. For example, since the coordinate value of the display module D 100-D corresponds to (3, 2), the processor of the display module D 100-D identifies the ID of the display module D 100-D as 6 ((2)−1)*3+3).

Figure 10:
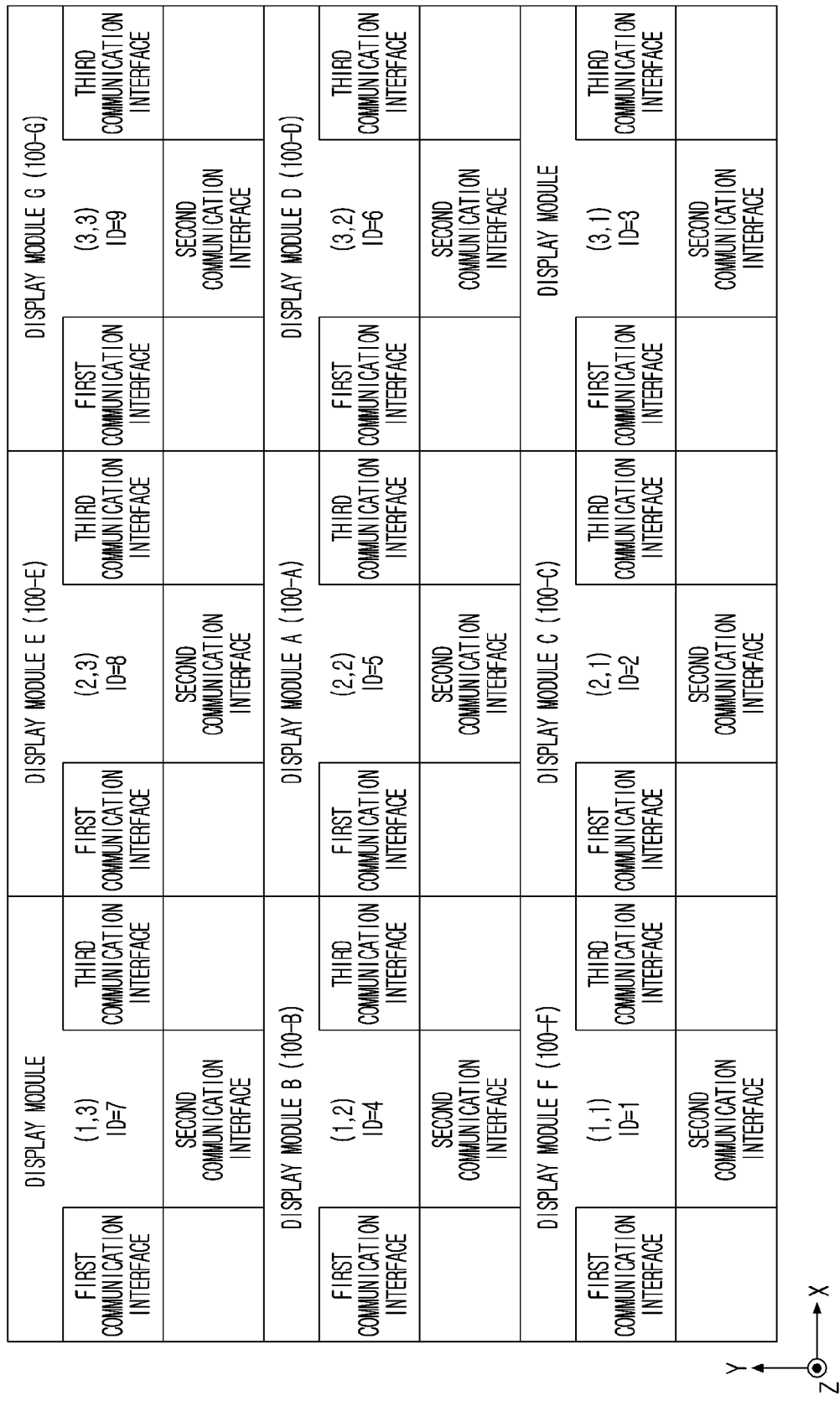
FIG. 10 is a diagram illustrating completion of setting of identification of a plurality of display modules in a modular display device according to an embodiment.

FIG. 10 is a diagram illustrating completion of setting of identification of a plurality of display modules in a modular display device according to an embodiment.

Referring to FIG. 10A, based on the ID setting method and Equation 1 described above, in the modular display device 1000, the respective IDs corresponding to the plurality of display modules constituting the modular display device 1000 may be set so as not to overlap each other based on the coordinate values of each display module and the x coordinate value of the fifth display module 100-5.

According to another embodiment, when the y coordinate value of the fifth display module 100-5 is received from at least one of the third display module 100-3 or the fourth display module 100-4, the processor 140 may identify the ID of the display module based on Equation 2 provided below.

$$ID=(x-1)*Y+y \qquad \text{Equation 2}$$

Here, ID is the ID of the display module, Y is the y-coordinate value of the fifth display module 100-5, x is the x-coordinate value of the display module, and y is the y-coordinate value of the display module.

Figure 11:
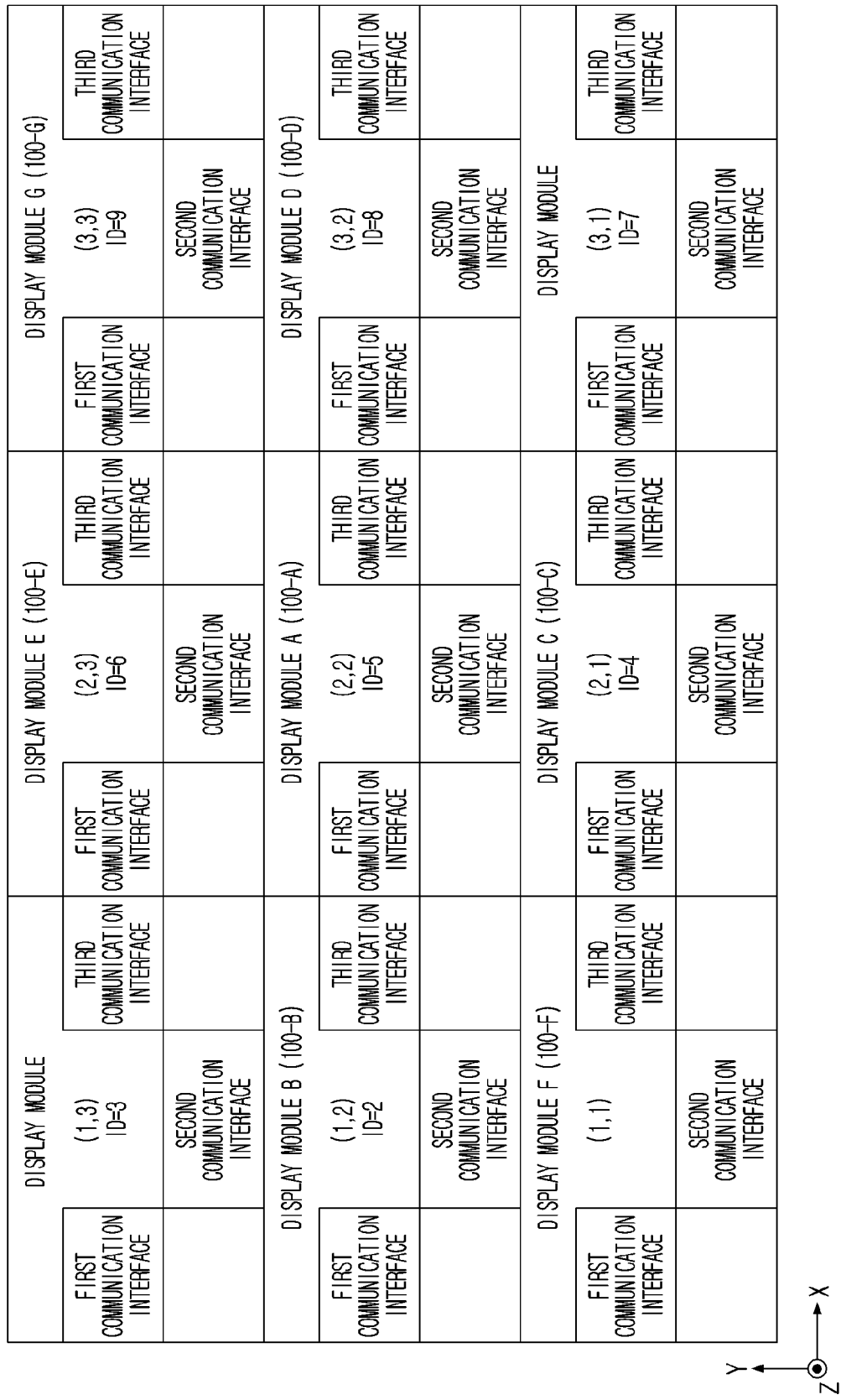
FIG. 11 is a diagram illustrating completion of setting of identification of a plurality of display modules in a modular display device according to an embodiment.

FIG. 11 is a diagram illustrating completion of setting of identification of a plurality of display modules in a modular display device according to an embodiment.

Referring to FIG. 11, based on the ID setting method and Equation 2 described above, in the modular display device 1000, the respective IDs corresponding to the plurality of display modules constituting the modular display device 1000 may be set so as not to overlap each other based on the coordinate values of the display modules and the y coordinate value of the fifth display module 100-5.

Referring to FIGS. 10 and 11, the IDs regarding the plurality of display modules constituting the entire group of display modules are set to be different according to the equation (e.g., Equation 1 or Equation 2) used to set in each display module and the type (e.g., x coordinate value or y coordinate value) of the coordinate value of the fifth display module 100-5. However, even in this case, different non-overlapping IDs are set for each display module.

When the setting of the coordinate values and IDs of the plurality of display modules configuring the modular display device 1000 is complete, each display module outputs a specific portion of an image corresponding to the coordinate value of each display module. Hereinafter, an embodiment related thereto is described in more detail.

First, when the setting of coordinate values and the IDs of the plurality of display modules configuring the modular display device 1000 is complete, the control box 2000 transmits image information to the reference display module 200. For example, when the ID setting of the reference display module 200 is complete, the reference display module 200 transmits information indicating that the coordinate setting and the ID setting of all the display modules are complete to the control box 2000. For example, after the reference display module 200 receives the coordinate value of the fifth display module 100-5, when the ID setting of the reference display module 200 based on the coordinate value of the reference display module 200 and the coordinate value of the fifth display module 100-5 is complete, the coordinate value of the fifth display module 100-5 is transmitted to the control box 2000 through a corresponding communication interface.

However, embodiments are not limited thereto, and the image information may be transmitted to any one of the plurality of display modules instead of the reference display module 200.

Upon receiving the image information, the processor of the reference display module 200 transmits the corresponding image information to other display modules. In this case, the processor of the reference display module 200 may transmit the image information to the other display modules based on a communication method other than the communication interface (e.g., first to third communication interfaces 110 to 130) for I2C communication or a separate video path. Each of the display modules 100 receiving the image information adjusts resolution of the corresponding image to correspond to the arrangement of the entire group of display modules.

FIG. 12 is a diagram illustrating a table used for image resolution adjustment according to an embodiment.

Referring to FIG. 12, resolution information according to a panel type may be stored in the memory of the display module 100. In this case, the processor 140 of the display module 100 adjusts the resolution of the image based on the x-coordinate information and the y-coordinate information of the fifth display module 100-5 received through the third communication interface 130. For instance, referring to FIGS. 8 and 12, it is assumed that the coordinates of the fifth display module 100-5 are identified as (5, 4). Also, it is assumed that a panel type of each display module 100 configuring the modular display device 1000 is IW008J. In this case, the processor 140 adjusts the resolution of the image from 960×540 to 4800×2160 based on (5, 4), which is the coordinate value of the fifth display module 100-5.

Also, the processor 140 identifies pixel information of a specific region of the image corresponding to a region in which the display module 100 is disposed based on the coordinate value of the display module 100, and then outputs the image based on the pixel information. As such, each display module 100 adjusts the resolution of the image to a resolution corresponding to the modular display device 1000 based on the identified coordinate value and displays a specific portion of the image corresponding to the position in which each display module 100 is disposed so that the user of the modular display device 1000 is provided with a high-resolution image without any sense of difference.

Figure 13:
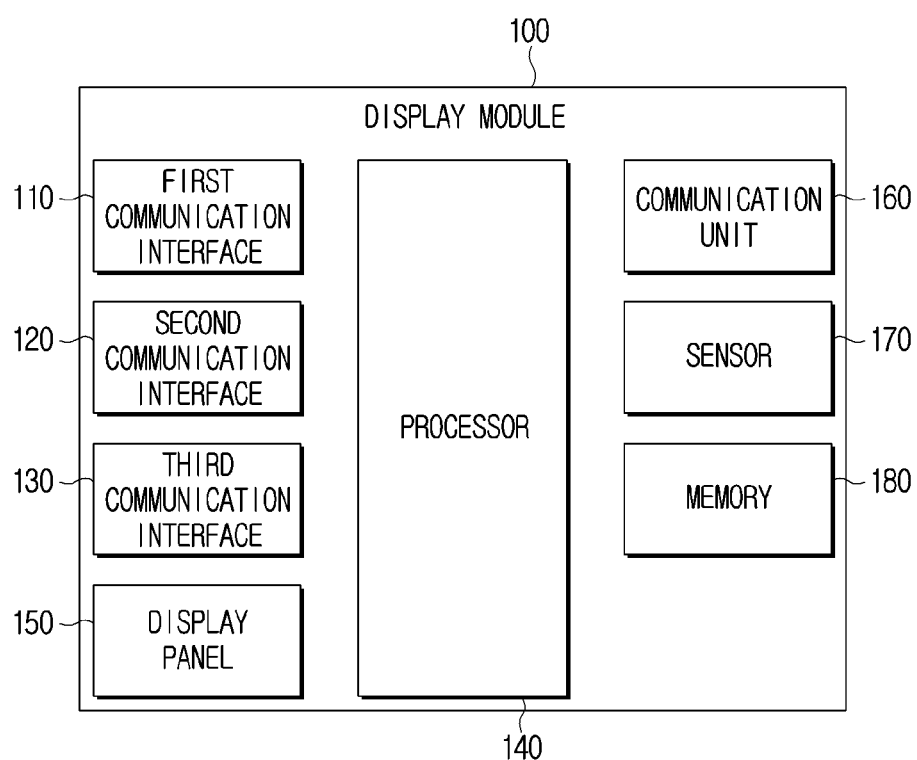
FIG. 13 is a block diagram of a display module according to an embodiment.

FIG. 13 is a block diagram of a display module according to an embodiment.

Referring to FIG. 13, the display module 100 includes a first communication interface 110, a second communication interface 120, a third communication interface 130, a processor 140, a display panel 150, a communication unit 160, a sensor 170, and a memory 180. Since the first communication interface 110, the second communication interface 120, the third communication interface 130, and the processor 140 have been described above, redundant descriptions thereof are omitted.

The display module 100 may output an image through the display panel 150. The display panel 150 may include any suitable type of display panel, such as a liquid crystal display (LCD) panel, an organic light emitting diode (OLED) panel, a plasma display panel (PDP), an inorganic LED panel, a micro-LED panel, etc., but embodiments are not limited thereto.

In addition, the display module 100 may communicate with various external devices using a wireless communication technology or a mobile communication technology through the communication unit 160. For example, the display module 100 may transmit and receive image information from an external device or the control box 2000 through the communication unit 160. In this case, the processor 140 adjusts resolution of received image information based on a coordinate value of the fifth display module 100-5 and displays a portion of the image corresponding to an arrangement position of the display module 100 through the display panel 150. Alternatively, the display module 100 may receive a start command related to coordinate setting or ID setting from an external device or the control box 2000 through the communication unit 160. The wireless communication technology may include, for example, Bluetooth, Bluetooth low energy (BLE), controller area network (CAN) communication, Wi-Fi, Wi-Fi Direct, ultra-wideband (UWB), Zigbee, infrared data association (IrDA), near field communication (NFC), etc. The mobile communication technology may include 3GPP, Wi-Max, long term evolution (LTE), 5G, etc.

According to some embodiments, the display module 100 may include the sensor 170. The sensor 170 may acquire various information related to the display module 100. The processor 140 may identify the presence of the display module disposed adjacent to the display module by the sensor 170. Through this, the processor 140 may immediately identify that coordinate setting of all the display modules configuring the modular display device 1000 is complete.

For example, based on the assumption that a first direction is a leftward direction of the display module 100, a second direction is a downward direction of the display module 100, a third direction is a rightward direction of the display module 100, and a fourth direction is an upward direction of the display module 100, when it is identified that the display module 100 is not disposed in the rightward direction and the upward direction of the display module 100 through the sensor 170, the processor 140 may immediately identify that the coordinate setting of the entire group of display modules has been complete even without identifying whether an Ack signal has been received for a predetermined period of time. For instance, the processor 140 may immediately identify that the display module 100 corresponds to the fifth display module 100-5 using the sensor 170.

An operating system (O/S) for driving the display module 100 may be stored in the memory 180. Also, a software program, set of instructions, or application for operating the display module 100 according to various embodiments may be stored in the memory 180.

In addition, the memory 180 may store various information, such as various data input, set, or generated during execution of a program, set of instructions, or application. For example, setting information regarding the first direction, the second direction, the third direction, and the fourth direction may be stored in the memory 180, and information on an initial coordinate value of the display module 100 may also be stored in memory 180. Also, table information for adjusting resolution of an image may be stored in memory 180.

Figure 14:
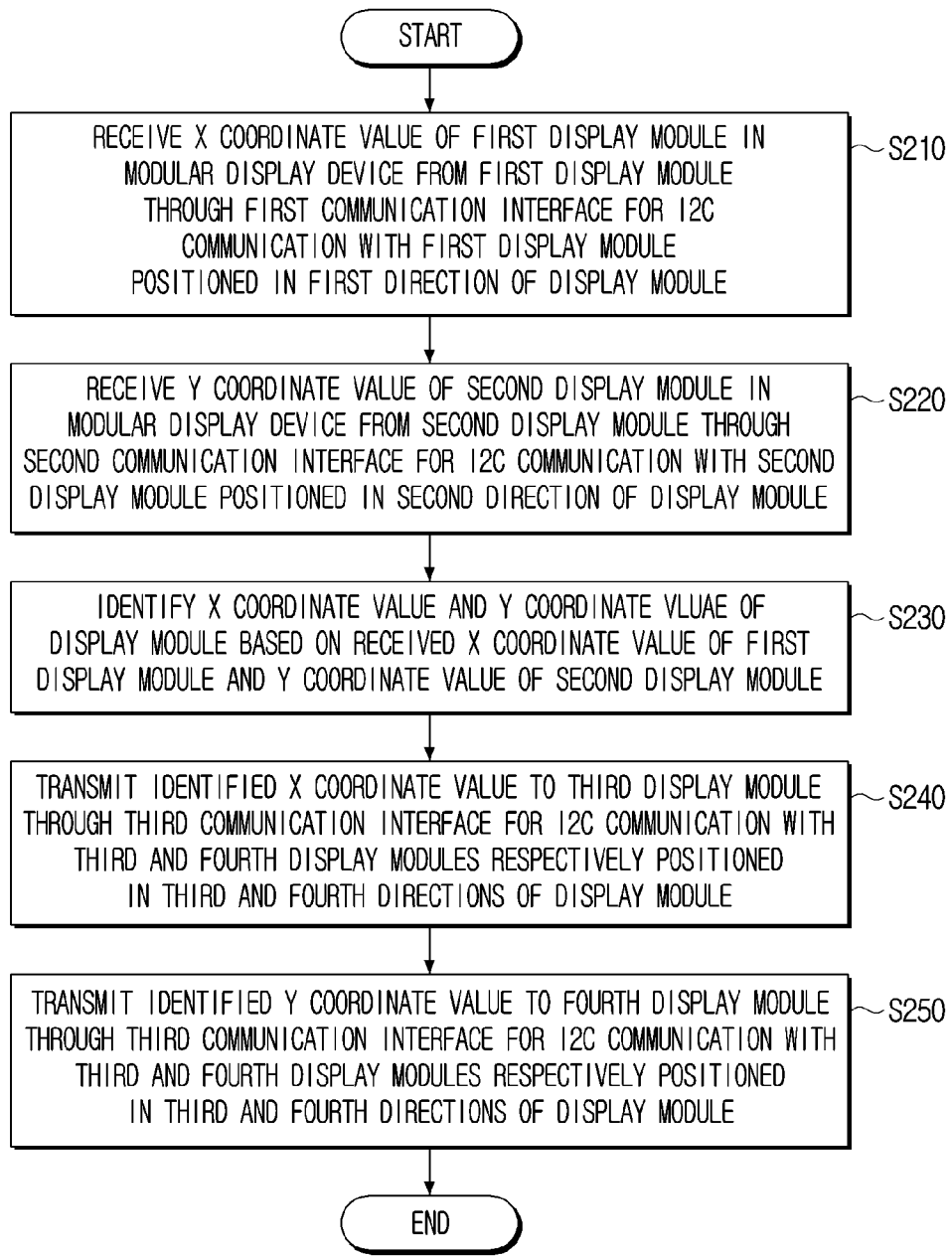
FIG. 14 is a flowchart schematically illustrating a method of controlling a display module device configuring a modular display device according to an embodiment.

FIG. 14 is a flowchart schematically illustrating a method of controlling a display module device configuring a modular display device according to an embodiment.

Referring to FIG. 14, the display module 100 receives an x coordinate value of the first display module 100-1 in the modular display device 1000 from the first display module 100-1 through a first communication interface 110 for I2C communication with the first display module 100-1 positioned in a first direction of the display module 100 (S210), and receives a y coordinate value of a second display module 100-2 in the modular display device 1000 from the second display module 100-2 through a second communication interface 120 for I2C communication with the second display module 100-2 located in a second direction of the display module 100 (S220).

Then, the display module 100 identifies an x-coordinate value and a y-coordinate value of the display module 100 based on the received x-coordinate value of the first display module 100-1 and y-coordinate value of the second display module 100-2 (S230), transmits the identified x coordinate value to a third display module 100-3 through a third communication interface 130 for I2C communication with the third display module 100-3 and a fourth display module 100-4 respectively located in the third and fourth directions of the display module 100 (S240), and transmits the identified y-coordinate value to the fourth display module 100-4 through the third communication interface 130 (S250). Details thereof have been described above through the display module 100, and thus are omitted.

Figure 15:
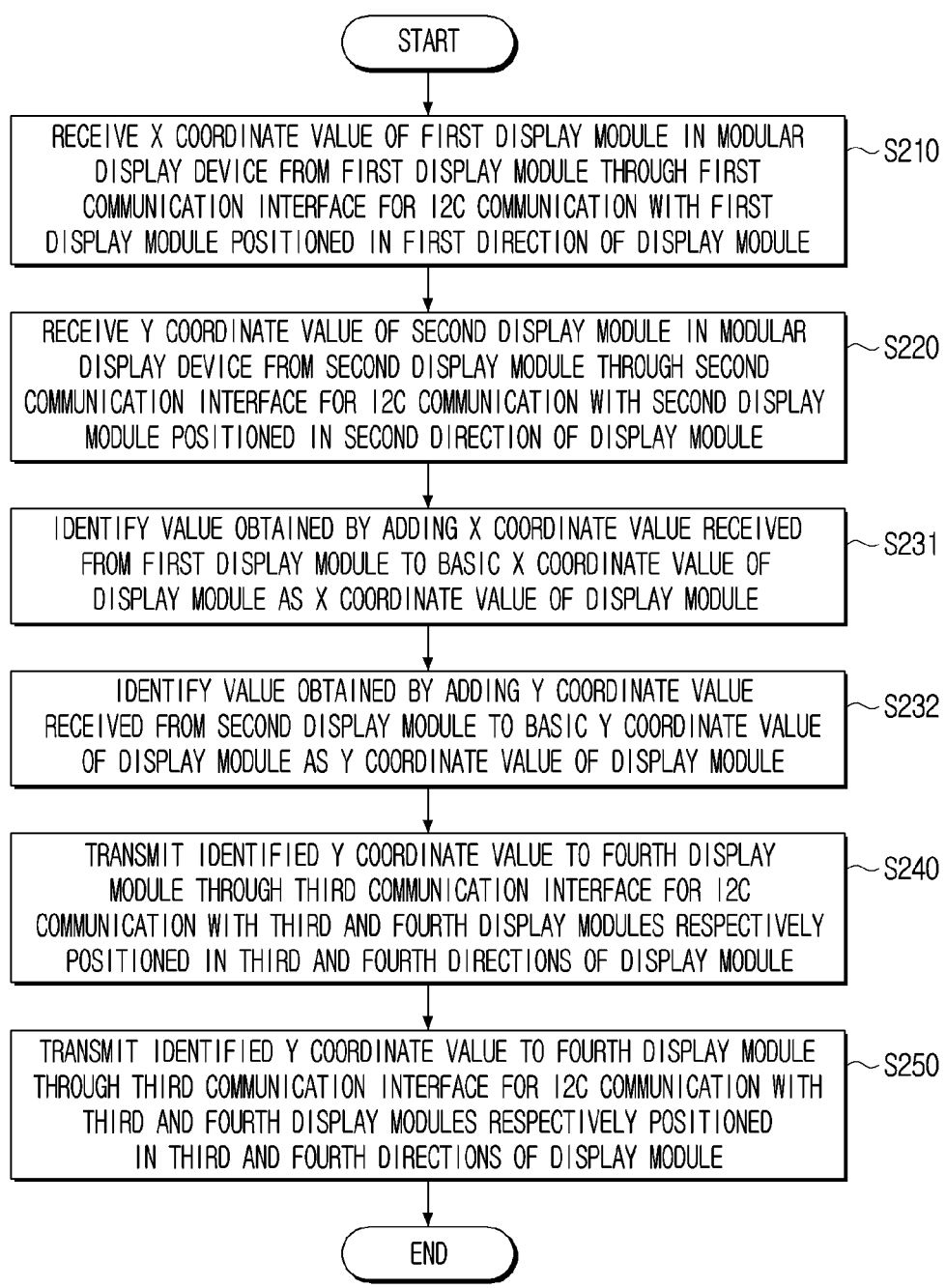
FIG. 15 is a flowchart schematically illustrating a method of identifying a coordinate value of a display module based on an x-coordinate value of a first display module and a y-coordinate value of a second display module according to an embodiment.

FIG. 15 is a flowchart schematically illustrating a method of identifying a coordinate value of a display module based on an x-coordinate value of a first display module and a y-coordinate value of a second display module according to an embodiment.

Referring to FIG. 15, the display module 100 receives the x-coordinate value of the first display module 100-1 from the first display module 100-1 (S210), receives a y coordinate value of the second display module 100-2 from the second display module 100-2 (S220), identifies, as an x coordinate value of the display module 100, a value obtained by adding the x coordinate value received from the first display module 100-1 to a basic x coordinate value of the display module 100 (S231), and identifies, as a y coordinate value of the display module 100, a value obtained by adding a y coordinate value received from the second display module 100-2 to a basic y coordinate value of the display module 100 (S232).

FIG. 16 is a flowchart schematically illustrating a method of identifying an identification corresponding to a display module based on an x-coordinate value of a fifth display module and a coordinate value of a display module according to an embodiment.

Referring to FIG. 16, the display module 100 receives an x coordinate value or a y coordinate value of the fifth display module 100-5 located at a corner portion in the modular display device through the third communication interface 130 from at least one of the third display module 100-3 and the fourth display module 100-4 (S260), and identifies an ID of the display module based on the x coordinate value or the y coordinate value of the fifth display module 100-5 and the x, y coordinate value of the display module (S270).

According to some embodiments, after identifying the ID of the display module 100, the display module 100 transmits the x coordinate value or the y coordinate value of the fifth display module 100-5 to the first display module 100-1 through the first communication interface 110 and to the second display module 100-2 through the second communication interface 120.

In the above description, steps S210 to S270 may be further divided into additional steps or combined into fewer steps according to some embodiments. In addition, some steps may be omitted as necessary, and the order of steps may be changed. In addition, the contents of the display device of FIGS. 1 to 12 described above may also be applied to the display control method of FIGS. 14 to 16, even if other contents are omitted.

According to some embodiments, the methods described above may be implemented in the form of an application that may be installed in an existing display module.

According to some embodiments, the methods described above may be implemented only by upgrading software or hardware of an existing display module.

In addition, various embodiments may be performed through an embedded server provided in a display device or at least one external server.

Various embodiments may be implemented in a computer or similar device-readable recording medium using software, hardware, or a combination thereof. In some cases, various embodiments may be implemented by the processor 140 itself. In the case of software implementation, embodiments, such as procedures and functions described in this disclosure, may be implemented as separate software modules. Each of the software modules may perform one or more functions and operations described in this disclosure.

Computer instructions for performing the processing operations of the display module 100 according to various embodiments may be stored in a non-transitory computer-readable medium. The computer instructions stored on such a non-volatile computer-readable medium may cause a particular device to perform processing operations according to various embodiments when executed by a processor.

A non-transitory computer-readable medium is not a medium for storing data for a short time, such as a register, cache, or memory, but refers to a medium that semi-permanently stores data and may be read by a device. For instance, the non-transitory computer-readable medium may include a CD, DVD, hard disk, Blu-ray disc, USB, memory card, or ROM.

Although certain embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. A display module configured to form a portion of a modular display device comprising a plurality of display modules, the display module comprising:
   a first communication interface configured to communicate, via inter-integrated circuit (I2C) communication, with a first display module among the plurality of display modules, the first display module being disposed in a first direction with respect to the display module;
   a second communication interface configured to communicate, via I2C communication, with a second display module among the plurality of display modules, the second display module being disposed in a second direction with respect to the display module;
   a third communication interface configured to communicate, via I2C communication, with third and fourth display modules among the plurality of display modules, the third and fourth display modules being respectively disposed in third and fourth directions with respect to the display module; and
   a processor configured to:
      receive, via the first communication interface from the first display module, an x coordinate value of the first display module;
      receive, via the second communication interface from the second display module, a y coordinate value of the second display module;
      identify an x coordinate value and a y coordinate value of the display module based on the received x coordinate value and the received y coordinate value;
      transmit the identified x coordinate value to the third display module via the third communication interface; and
      transmit the identified y coordinate value to the fourth display module via the third communication interface.

2. The display module of claim 1, wherein:
   the display module is adjacent to each of the first, second, third, and fourth display modules;
   the first direction is a direction opposite the third direction on an x axis of an x-y plane on which the plurality of display modules is disposed; and
   the second direction is a direction opposite the fourth direction on a y axis of the x-y plane.

3. The display module of claim 2, wherein the processor is configured to:
   add the received x coordinate value to a basic x coordinate value of the display module to identify the x coordinate value of the display module; and
   add the received y coordinate value to a basic y coordinate value of the display module to identify the y coordinate value of the display module.

4. The display module of claim 3, wherein:
   the first direction is a leftward direction with respect to the display module;
   the second direction is a downward direction with respect to the display module;
   the third direction is a rightward direction with respect to the display module; and
   the fourth direction is an upward direction with respect to the display module.

5. The display module of claim 3, wherein basic x coordinate values and basic y coordinate values of the plurality of display modules are equivalent.

6. The display module of claim 5, wherein:
   the basic x coordinate values of the plurality of display modules are 1; and
   the basic y coordinate values of the plurality of display modules are 1.

7. The display module of claim 1, wherein the processor is configured to identify, in response to an x coordinate value of a fifth display module disposed at an edge portion of the modular display device being received from at least one of the third display module and the fourth display module via the third communication interface, an identification of the display module based on the received x coordinate value of the fifth display module and an x, y coordinate value of the display module.

8. The display module of claim 7, wherein the processor is configured to identify the identification of the display module based on the following:

$$ID=(y-1)*X+x$$

wherein:
- ID is the identification of the display module;
- X is the x coordinate value of the fifth display module;
- x is the identified x coordinate value of the display module; and
- y is the identified y coordinate value of the display module.

9. The display module of claim 7, wherein the fifth display module is a display module disposed on a rightmost side of the modular display device from among the plurality of display modules, the first direction being a leftward direction with respect to the display module, the second direction being a downward direction with respect to the display module, the third direction being a rightward direction with respect to the display module, and the fourth direction being an upward direction with respect to the display module.

10. A method of controlling a display module in a modular display device comprising a plurality of display modules, the method comprising:
- receiving, from a first display module of the modular display device via a first communication interface configured to communicate via inter-integrated circuit (I2C) communication, an x coordinate value of the first display module, the first display module being disposed in a first direction with respect to the display module;
- receiving, from a second display module of the modular display device via a second communication interface configured to communicate via I2C communication, a y coordinate value of the second display module, the second display module being disposed in a second direction with respect to the display module;
- identifying an x coordinate value and a y coordinate value of the display module based on the received x coordinate value and the received y coordinate value;
- transmitting, via a third communication interface configured to communicate via I2C communication, the identified x coordinate value to a third display module of the modular display device, the third display module being disposed in a third direction with respect to the display module; and
- transmitting, via the third communication interface, the identified y coordinate value to the fourth display module of the modular display device, the fourth display module being disposed in a fourth direction with respect to the display module.

11. The method of claim 10, wherein:
- the display module is adjacent to each of the first, second, third, and fourth display modules;
- the first direction is a direction opposite the third direction on an x axis of an x-y plane on which the plurality of display modules is disposed; and
- the second direction is a direction opposite the fourth direction on a y-axis of the x-y plane.

12. The method of claim 10, wherein the identifying the x coordinate value and the y coordinate value of the display module comprises:
- adding the received x coordinate value to a basic x coordinate value of the display module to identify the x coordinate value of the display module; and
- adding the received y coordinate value to a basic y coordinate value of the display module to identify the y coordinate value of the display module.

13. The method of claim 12, wherein:
- the first direction is a leftward direction with respect to the display module;
- the second direction is a downward direction with respect to the display module;
- the third direction is a rightward direction with respect to the display module; and
- the fourth direction is an upward direction with respect to the display module.

14. The method of claim 12, wherein basic x coordinate values and basic y coordinate values of the plurality of display modules are equivalent.

15. The method of claim 14, wherein:
- the basic x coordinate values of the plurality of display modules are 1; and
- the basic y coordinate values of the plurality of display modules are 1.

16. The method of claim 10, further comprising:
- receiving an x coordinate value of a fifth display module disposed at an edge portion of the modular display device from at least one of the third display module and the fourth display module via the third communication interface; and
- determining an identification of the display module based on the x coordinate value of the fifth display module and an x, y coordinate value of the display module.

17. The method of claim 16, wherein the identification of the display module is identified based on the following:

$$ID=(y-1)*X+x$$

wherein:
- ID is the identification of the display module;
- X is the x coordinate value of the fifth display module;
- x is the identified x coordinate value of the display module; and
- y is the identified y coordinate value of the display module.

18. The method of claim 16, wherein the fifth display module is a display module disposed on a rightmost side of the modular display device from among the plurality of display modules, the first direction being a leftward direction with respect to the display module, the second direction being a downward direction with respect to the display module, the third direction being a rightward direction with respect to the display module, and the fourth direction being an upward direction with respect to the display module.

19. A display module comprising:
- at least one processor; and
- at least one memory comprising one or more sequences of one or more instructions that, in response to being executed by the at least one processor, are configured to cause the display module at least to:
  - receive, via a first interface configured to communicate via inter-integrated circuit (I2C) communication, an x coordinate value of a first display module adjacent to the display module in a first direction;
  - receive, via a second interface configured to communicate via I2C communication, a y coordinate value of a second display module adjacent to the display module in a second direction;
  - identify an x coordinate value and a y coordinate value of the display module based on the received x coordinate value and the received y coordinate value;
  - transmit, via a third interface configured to communicate via I2C communication, the identified x coordinate value to a third display module adjacent to the display module in a third direction; and
  - transmit, via the third interface, the identified y coordinate value to a fourth display module adjacent to the display module in a fourth direction,
- wherein the first, second, and third interfaces are different from one another.

20. The display module of claim 19, wherein the one or more sequences of one or more instructions are further configured to, in response to being executed by the at least one processor, cause the display module at least to:
  receive, via the third interface, an x or y coordinate value of another display module; and
  identify an identification value of the display module based on the x or y coordinate value of the another display module, the identified x coordinate value of the display module, and the identified y coordinate value of the display module.

* * * * *